United States Patent [19]

Brown et al.

[11] Patent Number: 4,523,310

[45] Date of Patent: Jun. 11, 1985

[54] SYNCHRONOUS COMMUNICATIONS MULTIPLEXER

[75] Inventors: William H. Brown, Coral Springs; James A. Starkweather, Fort Lauderdale; Hugh M. Humphreys, Coral Springs, all of Fla.

[73] Assignee: Gould Computer Systems Inc., Fort Lauderdale, Fla.

[21] Appl. No.: 462,056

[22] Filed: Jan. 28, 1983

[51] Int. Cl.³ .............................................. H04J 3/02
[52] U.S. Cl. .................................................. 370/112
[58] Field of Search .................. 370/112, 114, 80, 79, 370/110.1, 100; 364/200, 900

[56] References Cited

U.S. PATENT DOCUMENTS

| | | | |
|---|---|---|---|
| 4,071,887 | 1/1978 | Daly et al. | 364/200 |
| 4,079,452 | 3/1978 | Larson et al. | 364/200 |
| 4,121,055 | 10/1978 | Doherty | 370/112 |
| 4,313,193 | 1/1982 | Nakano et al. | 370/112 |
| 4,429,382 | 1/1984 | Greenstein et al. | 370/80 |

Primary Examiner—Douglas W. Olms
Attorney, Agent, or Firm—Fleit, Jacobson, Cohn & Price

[57] ABSTRACT

A synchronous communications multiplexer for connecting a plurality of synchronous communications lines to an MP (multi-purpose) bus. In its basic form, the multiplexer is capable of handling bit oriented protocols (BOP) and is capable of being upgraded to support byte-oriented protocols. The present invention supports full- or half-duplex data rates of up to 19,200 baud. Total throughput, when operating with four ports (as an example), is in the range of 76.8 kbits/sec. A special mode of operation (unisync) allows operating a single port at 56 kbits/sec., full duplex. Other capabilities include software-selection of parameters (such as baud rate) and operation in a "transmitter queueing" mode of operation.

7 Claims, 15 Drawing Figures

EOI (END OR IDENTIFY) LOGIC

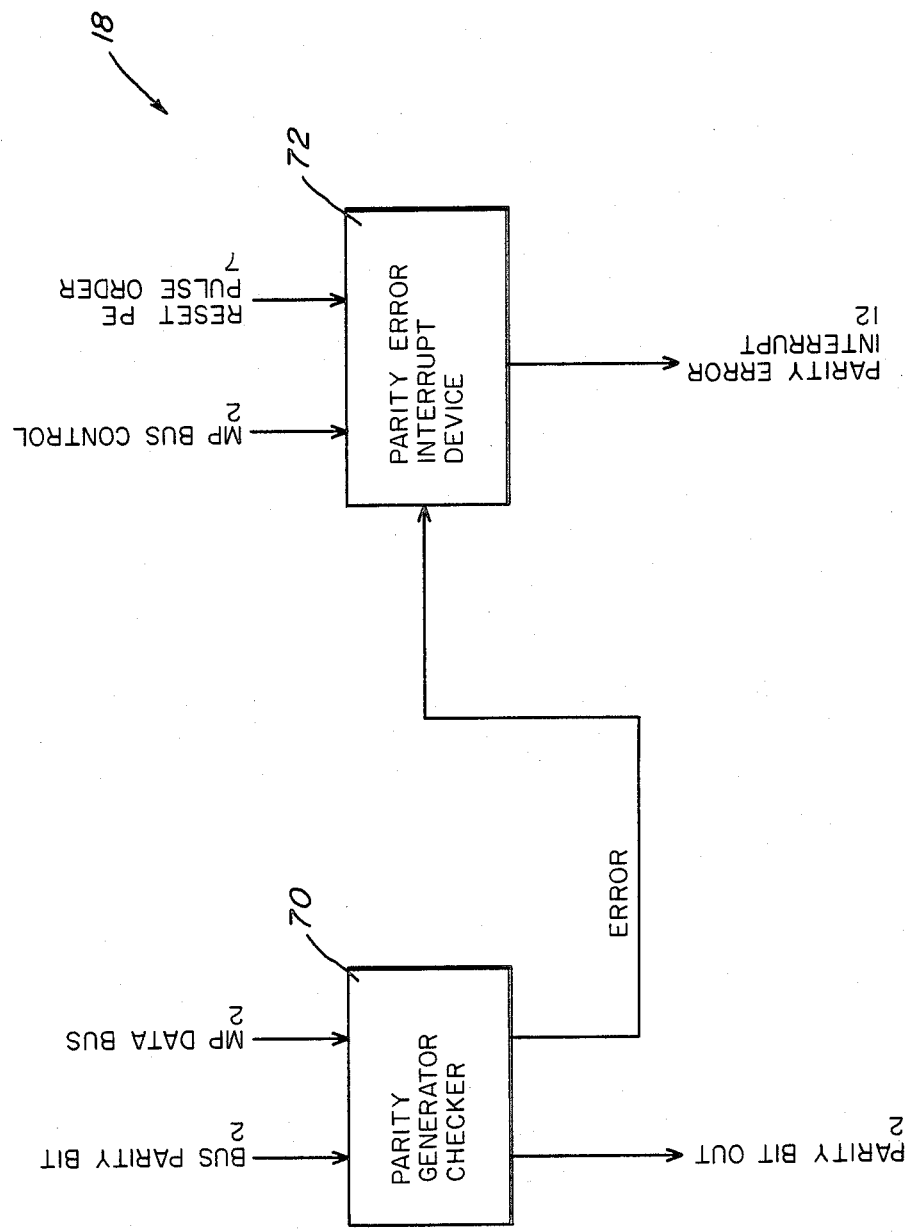
FIG. 4 PARITY LOGIC

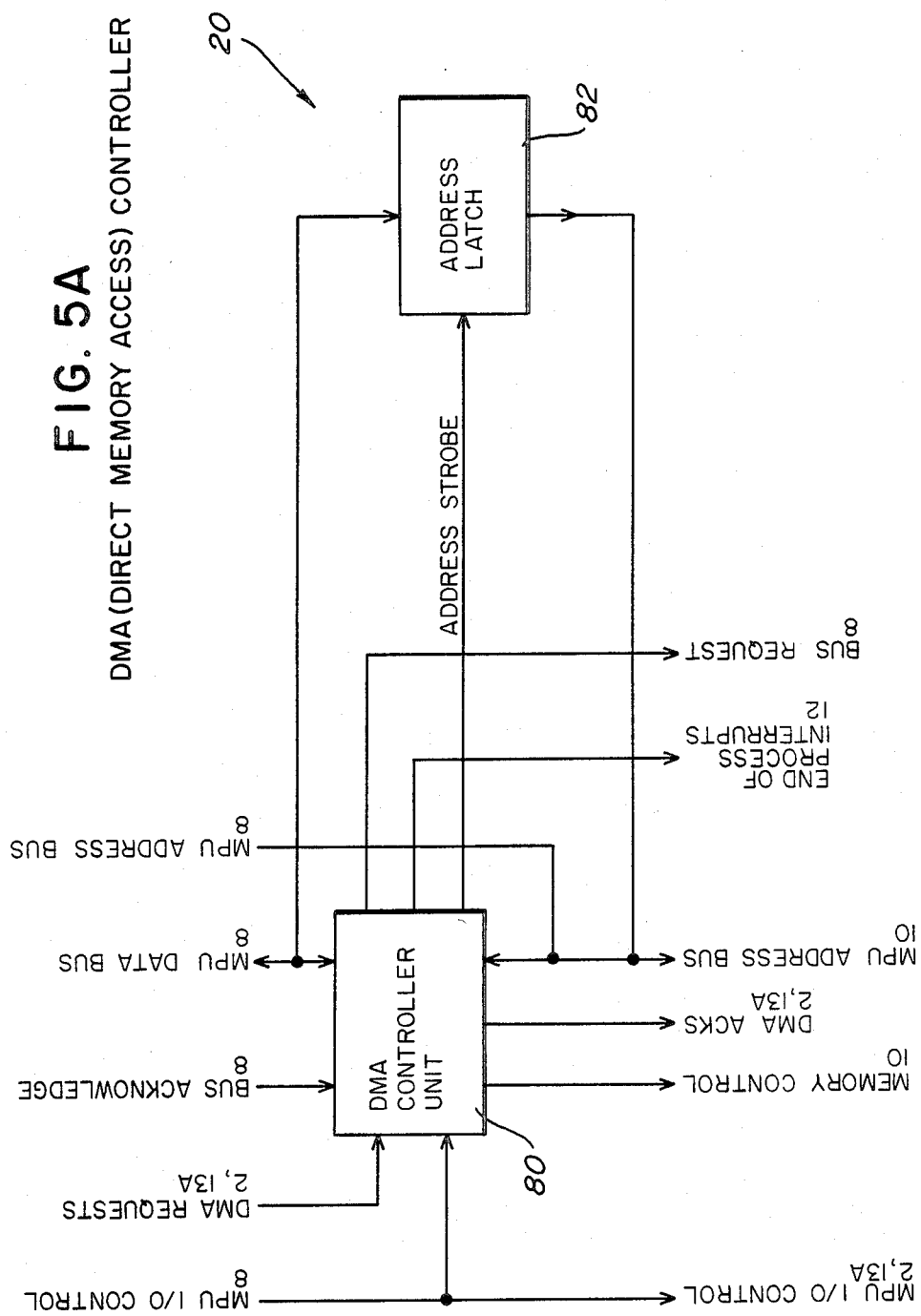

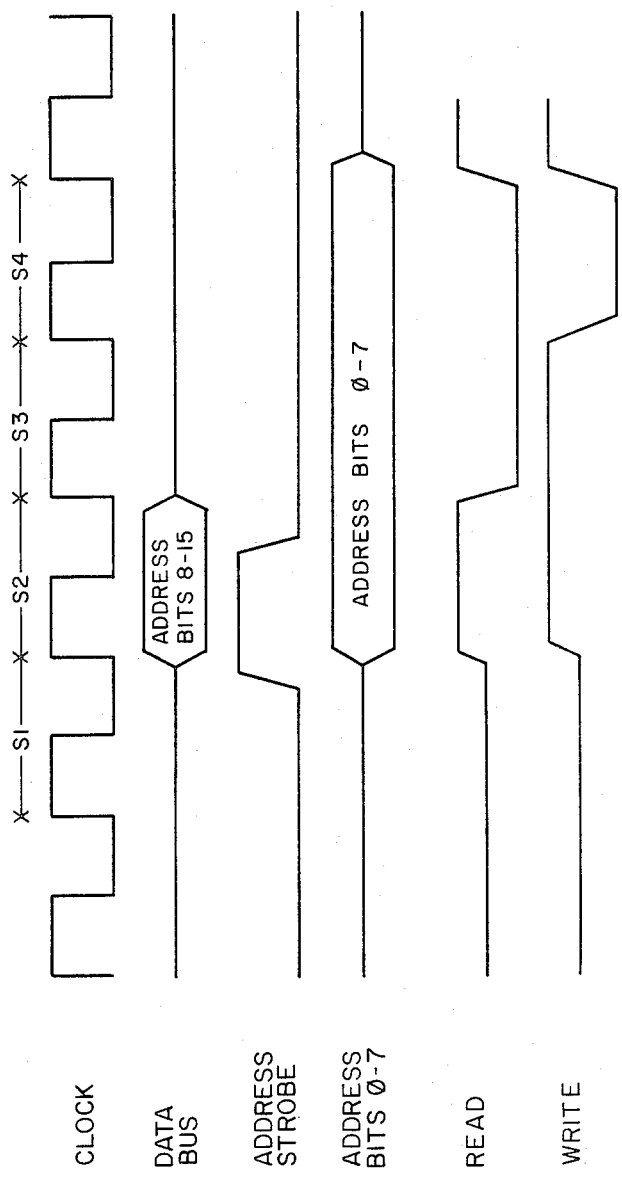

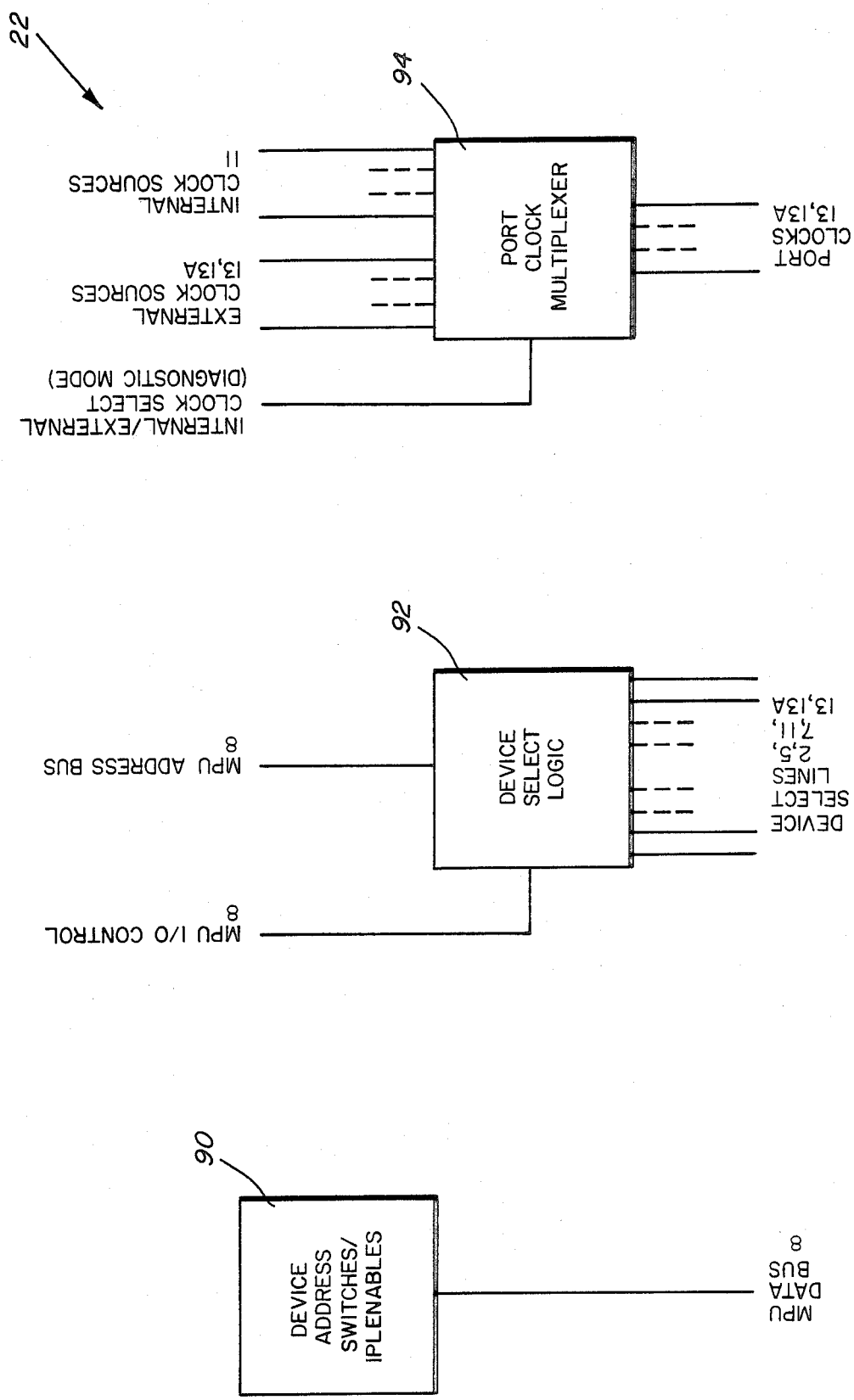
FIG. 6 DEVICE SELECT/DEVICE ADDRESS/PORT CLOCKS SELECT

LEVEL / PULSE ORDERS

MPU (MICROPROCESSOR UNIT)

PROM (PROGRAMABLE READ ONLY MEMORY)

RAM (RANDOM ACCESS MEMORY)

INTERVAL TIMER / BRG (BAUD RATE GENERATOR)

INTERRUPT LOGIC

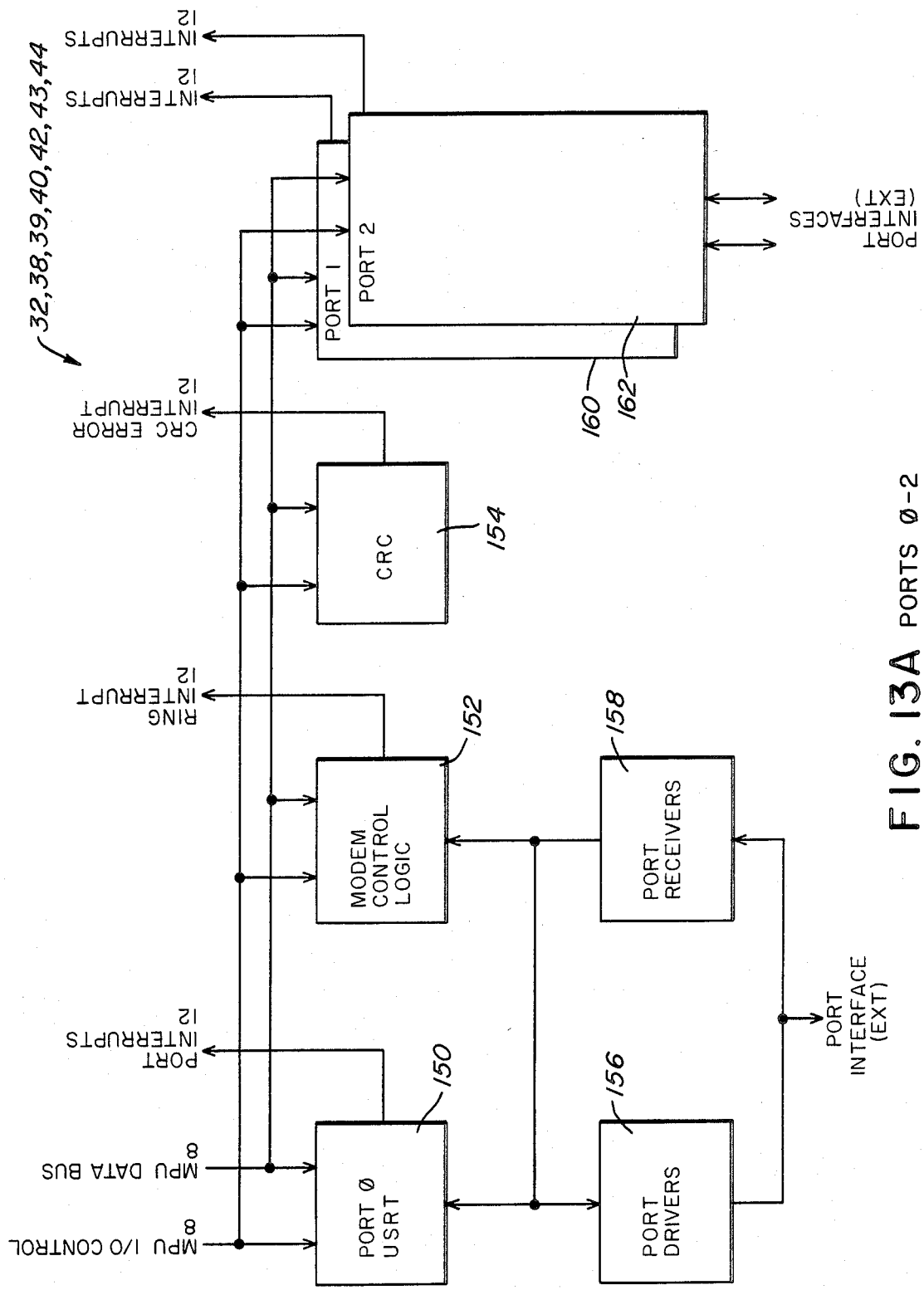
FIG. 13A PORTS 0-2

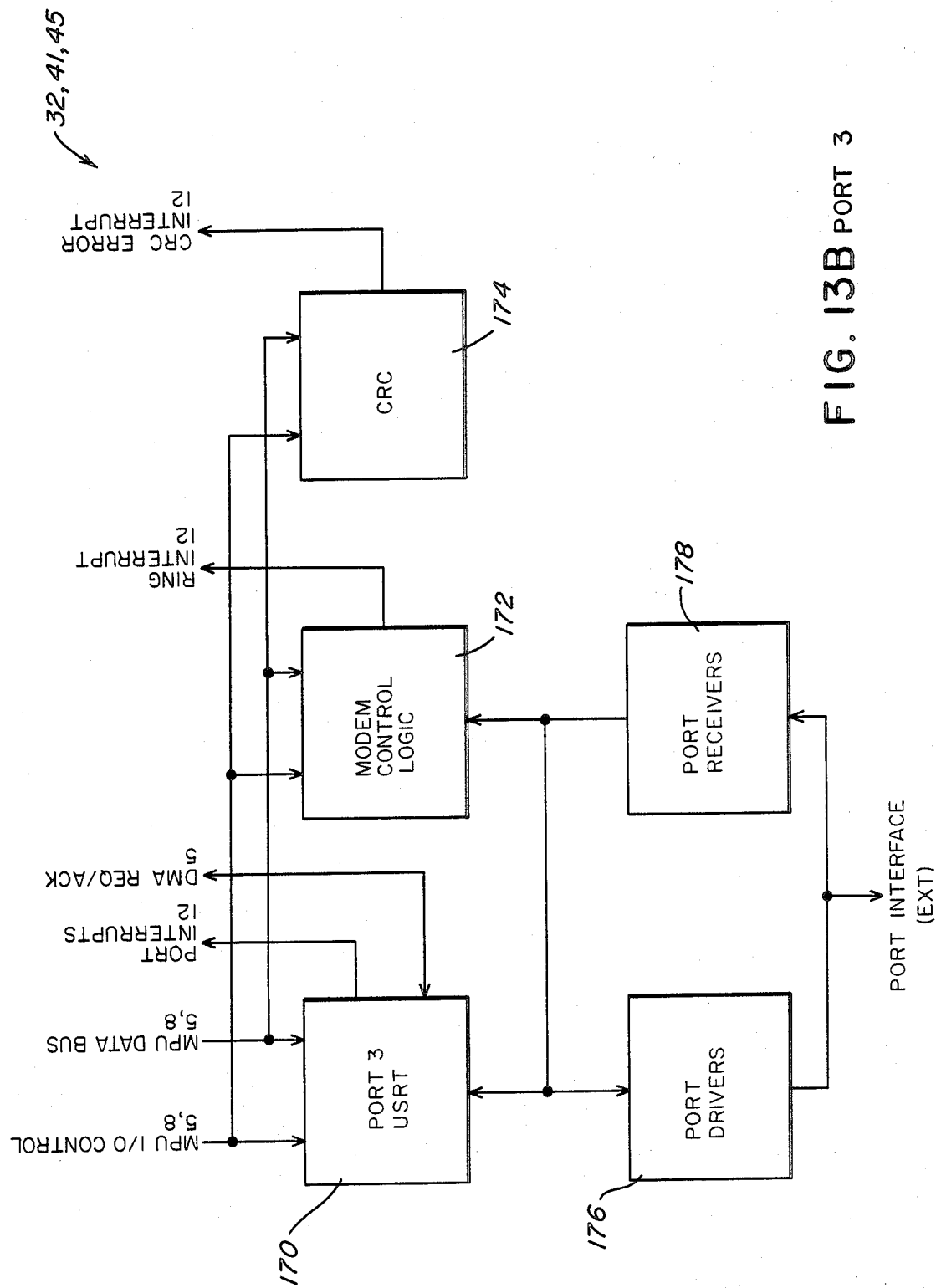
FIG. 13B PORT 3

SYNCHRONOUS COMMUNICATIONS MULTIPLEXER

BACKGROUND OF THE INVENTION

1. Field of the Invention

The present invention relates to a synchronous communications multiplexer for connecting a plurality of synchronous communications lines to an MP (multipurpose) bus of a host computer via an input output processor. In its basic form, the multiplexer is capable of handling bit protocols (BOP) and is capable of being upgraded to support byte-oriented protocols. The present invention supports full- or half-duplex data rates up to 19,200 baud. Total throughput, when operating with four ports (as an example), is in the range of 76.8 kbits/sec. A special mode of operation (unisync) allows operating a single port at 56 kbits/sec., full duplex.

2. Description of the Prior Art

Up to this point, prior art practitioners have not developed a communications multiplexer which is capable of multi-protocol operation as described above with respect to the present invention.

One communications controller of the prior art is disclosed in U.S. Pat. No. 4,079,452—Larson et al. Specifically, the patent discloses a programmable controller with modular firmware for communication control, wherein a programmable controller module operably couples a plurality of peripheral devices of various communication disciplines to a data processor or to remote programmable controller modules through a serial interface adapter or parallel interface adaptor. The programmable controller module of Larson et al comprises a special-purpose computer having a program of sub-routines arranged in memory modules, which define and implement specific communication protocols (routines) for different communication disciplines.

However, in contrast to the present invention, the programmable controller of Larson et al does not provide for the connection of the programmable controller to an MP (multi-purpose) bus.

A further arrangement of the prior art is disclosed in U.S. Pat. No. 4,071,887—Daly et al, that patent disclosing an integrated circuit synchronous data adaptor (SSDA) which provides a bi-directional interface for synchronous data interchange. Internal control and interface logic, including a first-in-first-out (FIFO) buffer memory, enables simultaneous transmission and reception of standard synchronous communication characters to allow data transfer between serial data channels and the parallel bi-directional data bus of a bus-organized system.

However, as was the case with respect to the Larson et al patent (discussed above), the Daly et al patent discloses a synchronous controller without mention of the use of a synchronous serial data adaptor with an MP (multi-purpose) bus, as is the case with respect to the present invention.

A third arrangement of the prior art is embodied in a quad serial I/O interface, designated QLVII quad serial I/O interface for DEC LSI-11 based equipment, manufactured by General Robotics Corporation. The subject quad serial I/O interface offers full DEC DLVII-E compatibility on any of four RS-232 ports, and uses one quad-height Q bus module slot. Standard features include auto-answer modem support for BELL-type 103, 113, 202C, 202D and 212 modems. All ports are individually selected to be synchronous serial I/O ports, and baud rates are switch-selectable individually for each port in the range of 50–19,200 baud.

Nevertheless, the QLVII quad serial I/O interface does not support bit-oriented protocols (BOP), as does the present invention. In addition, the QLVII is not software-programmable, configuration information (such as baud rate) being selected by means of manual switches, as opposed to the software selection which typifies the present invention.

SUMMARY OF THE INVENTION

According to the present invention, there is provided a synchronous communications multiplexer for connecting a plurality of synchronous communication lines to an MP (multi-purpose) bus.

In its basic form, the multiplexer is capable of handling bit protocols (BOP). Full- or half-duplex data rates of up to 19,200 baud are supported by the present invention. Total throughput, when operating four ports (for example), is in the range of 76.8 kbits/sec.

In accordance with a further feature of the present invention, a special version of firmware may be provided to operate one line at a maximum rate of 56 kbits/sec-full duplex. However, in such a configuration, operation will be for BOP only.

As will be seen in the detailed description below, the synchronous communications multiplexer is a microprocessor-based system, and includes, in addition to the microprocessor, the following: an MP (multi-purpose) bus interface, DMA circuitry, vectored interrupt logic, CRC generation and checking logic, a control PROM, a RAM, timing and control logic, modem control logic, and line interface logic.

As a result of the fact that the synchronous communications multiplexer is a microprocessor-based system, an advantage over the prior art can be achieved, in that the synchronous communications muliplexer is capable of software-selection (as opposed to manual switch selection) of parameters (such as baud rate). The synchronous communications multiplexer is software selectable in the sense that the software is down loaded into the multiplexer as commanded by the host computer.

Therefore, it is an object of the present invention to provide a synchronous communications multiplexer which is capable of connecting a plurality of synchronous communications lines to a multi-purpose bus of a host computer.

It is an additional object of the present invention to provide a synchronous communications multiplexer which is capable of multi-protocol operation.

It is an additional object of the present invention to provide a synchronous communications multiplexer which is capable of full-or half-duplex data rates of up to 19,200 baud, while maintaining adequate or more than adequate total controller throughput (76.8 k/bits/sec when operating with four ports).

The above and other objects that will hereinafter appear, and the nature of the invention, will be more clearly understood by reference to the following description, the appended claims, and the accompanying drawings.

BRIEF DESCRIPTION OF DRAWINGS

FIG. 4 is a diagram of the parity logic 18 of FIG. 1.

FIG. 5A is a diagram of the direct memory access (DMA) controller 20 of FIG. 1.

FIG. 5B is a timing diagram relating to the data transfer cycle of the DMA controller 20.

FIG. 6 is a diagram of the device select 22 of FIG. 1.

FIG. 13A is a diagram of communication ports 0, 1 and 2 of FIG. 1.

FIG. 13B is a diagram of communication port 3 of FIG. 1.

DETAILED DESCRIPTION

The synchronous communications multiplexer of the present invention will now be described in more detail, with reference to the various figures of the drawings.

Figure 1:
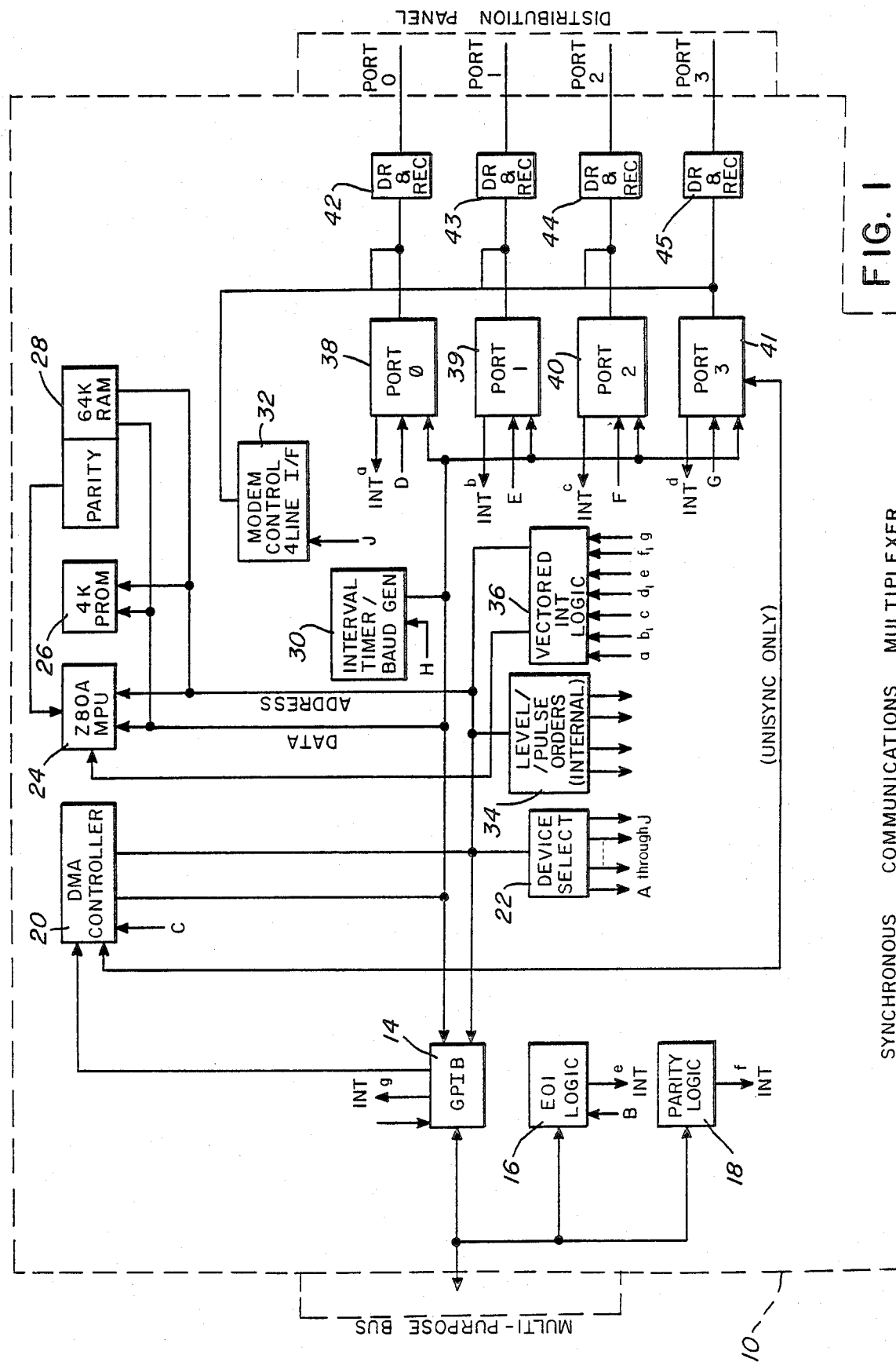
FIG. 1 is a block diagram of the synchronous communications multiplexer of the present invention.

FIG. 1 is a block diagram of the synchronous communications multiplexer of the present invention. As seen therein, the synchronous communications multiplexer comprises an internal data and address bus coupling general purpose instrument bus (GPIB) 14, end or identify (EOI) logic 16, parity logic 18, direct memory access (DMA) controller 20, device select 22, microprocessor 24, programmable read only memory (PROM) 26, random access memory (RAM) 28, interval timer/baud generator 30, modem control and line interface 32, level/pulse orders circuitry 34, vectored interrupt logic 36, cyclical redundancy check (CRC) generation and checking logic 38-41, and driver and receiver circuitry 42-45.

As indicated previously, the synchronous communications multiplexer 10 of FIG. 1 is a microprocessor-based system. The microprocessor 24 is an N-channel silicon gate central processing unit with a 158-instruction capability. Included in the instruction set are such commands as load, exchange register, branch conditional, call, return, rotate, shift, arithmetic, logical, block transfer, search, and I/O instructions. Other freatures of the microprocessor 24 include the provision of 17 internal registers, several interrupt and addressing modes, and a 1- to 5-microsecond instruction execution cycle. As an exception to the latter criterion, block transfer and search instruction times depend on block size.

The I/O structure of the multiplexer 10 utilizes an isolated I/O technique in which input and output instructions are each used to communicate with the peripherals. There are a maximum of 256 I/O ports available, and addressing assignments of the synchronous communications multiplexer 10 are discussed in more detail below.

The GPIB 14 is utilized to interface the microprocessor 24 to the multi-purpose bus (connected to the driver and receiver circuitry 12) coupled to the input output processor of the host computer. The GPIB 14 handles the necessary protocol of the multiplexer 10, which protocol is similar to the IEEE 488 bus protocol (known to those of skill in the art). Capabilities of the GPIB 14 include data transfer, handshake management, talker/listener addressing procedures, service requests, and both serial and parallel polling. As will be seen in the detailed discussion below, the GPIB 14 (which is basically implemented by an INTEL 8291 GPIB talker/listener device) has 16 registers. Eight of the registers may receive an input from the microprocessor 24. One of the eight registers may receive data transferred thereto, and the remainder may be provided with control information for configuration of the GPIB 14. The eight registers, comprising the input or read registers of the GPIB 14, provide received data and perform a monitoring function with respect to the states of the talker/listener device, the bus conditions, and the device conditions.

The EOI logic 16, to be discussed in more detail below, basically performs the function of signalling the end of a data burst occurring on the input output or I/O channel bus which is part of the multi-purpose bus.

Parity logic 18, also connected to the input output or I/O channel bus, performs the function of checking the validity of data received and of generating parity for data transmitted from or to the I/O port.

The DMA controller 20 is basically implemented by an AMD 9517 multi-mode DMA controller, and functions to reduce the microprocessor overhead and connection time with respect to the IOP channel bus, i.e., the input output processor channel bus associated with the host computer. The DMA controller 20 additionally transfers data between the IOP channel bus and the RAM 28, thus freeing the microprocessor 24 to perform other tasks while such transfer is taking place such during the querred transmitter operation.

The device select logic 22 performs the function of decoding I/O addresses from the microprocessor 24, and creates chip enable signals for enabling addressed elements or devices (LSI chips).

Programmable read-only memory (PROM) 26 is a conventional read-only memory which is pre-programmed to contain the operational program for execution by the microprocessor 24. Up to 4K (4,096) locations of storage space are provided in the PROM 26 for the storage of executive control programs to control, e.g., the loading (down loading) of the microcode instruction set corresponding to different communications protocol from the host computer into RAM 28.

RAM 28 is a random access memory, such random access memories being conventional and well-known in the art. 64K (65,536) locations of dynamic memory storage are provided in the RAM 28 for the storage of writeable control store (WCS) firmware (the microcode instruction set corresponding to a mode of data transfer), parameters and data (such as the data outbound for the communications line), each storage location being 8 bits in length plus parity.

The interval timer/baud generator 30 performs two functions: (1) it functions as an interval timer to provide a timer interrupt to the microprocessor 24, thus providing a "real time" clock; and (2) it functions as a baud rate generator to provide four timing signals (clock signals) to be used by the port transmitters as an internal transmit clock.

Modem control and line interface 32 is basically implemented by a Signetics 2652 mutli-protocol communications circuit. The modem control and line interface 32 controls and detects the request to send (RTS), data terminal ready (DTR), clear to send (CTS), data set ready (DSR), and data carrier detect (DCD) lines. Signals compatible with RS-232C and RS-449 standards are relayed to a separate distribution panel (not shown) which contains the specified connectors.

A list of supported lines for the RS-232C standard is given in Table 1 below, and RS-232C line definitions are also provided below.

TABLE 1

| LINE | RS-232C DESIGNATION |
| --- | --- |
| Chassis Ground | (AA) |
| Signal Ground | (AB) |
| Transmit Data | (BA) |
| Receive Data | (BB) |
| Request To Send | (CA) |
| Clear To Send | (CB) |
| Data Set Ready | (CC) |
| Data Terminal Ready | (CD) |
| Ring Indicator | (CE) |
| Data Carrier Detect | (CF) |
| Transmitter Signal Timing | (DA) |
| Transmitter Signal Timing | (DB) |
| Receiver Signal Timing | (DD) |

The supported RS-232C lines are defined as follows:

Chassis Ground (AA)—this line provides a safety ground for the distribution panel chassis.

Signal Ground (AB)—this line provides reference ground for the various signals.

Transmit Data (BA)—this line contains serial transmit data sent from the controller.

Receive Data (BB)—this line contains serial data received by the controller.

Request To Send (CA)—this signal is generated by the controller to indicate that it is ready to transmit data. Clear To Send is returned by the connected device to indicate that the transmission can proceed.

Clear to Send (CB)—this signal is generated by the connected device to indicate to the controller that transmission can proceed.

Data Set Ready (CC)—this signal is generated by the connected device to indicate a "ready to transfer" condition.

Data Terminal Ready (CD)—this signal is generated by the controller to indicate a port ready condition to the connected device.

Ring Indicator (CE)—this signal is generated by the connected device when an incoming call is present. The controller should respond with Data Terminal Ready (to connect).

Data Carrier Detect (CF)—this signal is generated by the connected device to indicate that data on the receive data line is valid.

Transmitter Signal Timing (DA)—this signal is supplied to the controller, and provides a clock signal to the connected device, the clock signal to be used for determining the state of the transmit line.

Transmitter Signal Timing (DB)—this signal is supplied by the connecting device, and provides a clock used by the controller to transmit data on the transmit line.

Receiver Signal Timing (DD)—this signal is supplied by the connected device, and provides a clock used by the controller to determine the state of the receive line.

A list of supported lines for the RS-449 standard is given in Table 2 below, and the RS-449 line definitions are also provided below.

TABLE 2

| LINE | RS-449 DESIGNATION |
| --- | --- |
| Shield | — |
| Send Common | (SC) |
| Receive Common | (RC) |
| Send Data | (SD) |
| Receive Data | (RD) |
| Request To Send | (RS) |
| Clear To Send | (CS) |
| Data Mode | (DM) |
| Receiver Ready | (RR) |
| Terminal Ready | (TR) |
| Incoming Call | (IC) |
| Send Timing | (ST) |
| Receive Timing | (RT) |
| Terminal Timing | (TT) |

The supported RS-449 lines are defined as follows:

Shield—this line provides a safety ground for the chassis.

Send Common (SC)—this line provides the reference common for signals transmitted from the controller to the connected device.

Receive Common (RC)—this line provides the reference common for signals received from the connected device by the controller.

Send Data (SD)—this line contains serial data transmitted from the synchronous communications multiplexer.

Receive Data (RD)—this line contails serial data received from the connected device by the multiplexer.

Request To Send (RS)—this signal is generated by the multiplexer to indicate that it is ready to transmit data to the connected device. Clear To Send is returned by the connected device to indicate that the transmission can proceed.

Clear To Send (CS)—this signal is generated by the connected device to indicate that a transmission from the synchronous communications multiplexer may proceed.

Data Mode (DM)—this signal is generated by the connected device to indicate a "ready to transfer data" condition.

Receiver Ready (RR)—this signal is generated by the connected device to indicate the presence of valid data on the receive data line.

Terminal Ready (TR)—this signal is generated by the multiplexer to indicate a "port ready" condition to the connected device.

Incoming Call (IC)—this signal is generated by the connected device to announce an incoming call. The controller will respond by "terminal ready to connect".

Send Timing (ST)—this is a clock signal from the connected device to be used for transmitting data on the Send Data line.

Receive Timing (RT)—this is a clock signal from the connected device to be used for determining the state of the data on the Receive Data line.

Terminal Timing (TT)—this is a clock supplied by the multiplexer to be used by the connected device for generating clock signals.

The synchronous communications multiplexer 10 of FIG. 1 will support the following internally generated baud rates, listed below with their corresponding divisor-decimal/hex designation (the latter will be explained in more detail below):

TABLE 3

| BAUD RATE | DIVISOR-DECIMAL/HEX |
|---|---|
| 600 | 4224/1080 |
| 1200 | 2112/840 |
| 2400 | 1056/420 |
| 4800 | 528/210 |
| 7200 | 352/160 |
| 9600 | 264/108 |
| 19200 | 132/84 |
| 56000* | 45/2D |
| 50000* | 51/33 |
| 40800* | 62/3E |

*This baud rate is supported by the quad synchronous communications controller 10 of FIG. 1 in its "unisync" configuration only.

As mentioned above, the synchronous communications multiplexer 10 of FIG. 1 is provided with an interval timer/baud generator 30 which functions as both an interval timer and a baud generator at various times. It has internal counters which are loaded with the appropriate hex value for the corresponding baud rate during the initialization period, such taking place via a mode control command (FFH) discussed in more detail below. The hex constants provide an internal frequency of twice the required rate, this rate being divided by two to produce the desired baud rate.

As stated above, the modem control and line interface 32 is basically implemented by a Signetics 2652 multi-protocol communications circuit (MPCC), which is used in the interface to transmit and receive synchronous serial data. SLDC, HDLC and ADCCP are the BOP's which are supported. Four MPCC's are used in the synchronous communications multiplexer, one being provided per line.

Among the programmable options of the MPCC are the following:
 (a) error control—CRC, VRC or no error check;
 (b) character length—1 to 8 bits (BOP);
 (c) secondary station address compare (BOP);
 (d) idle transmission of flag or mark (BOP);
 (e) detection and generation of BOP control sequences (flag, abort, GA); and
 (f) zero insertion and deletion (BOP).

A level/pulse orders circuit 34 (FIG. 1) is provided in the synchronous communications multiplexer 10 to provide level orders enable/disable interrupts and reset interrupts.

The synchronous communications multiplexer 10 is also provided with a vectored interrupt logic circuit 36, the latter utilizing the "mode 2" interrupt operation of the microprocessor 24. Upon detection of an interrupt, the logic 36 will set the IRQ line to the microprocessor 24. When the microprocessor 24 acknowledges the interrupt, a single address byte is placed on the data bus. This byte is merged in the microprocessor with the I-register, which contains the vector page address, to form the address of the interrupt vector. This technique allows a maximum of 128 unique interrupt vectors to be generated.

The synchronous communications multiplexer 10 of FIG. 1 also includes four ports 38–41 and respective driver and receiving elements 42–45 connected to a distribution panel.

The synchronous communications multiplexer 10 of FIG. 1 requires configuration information for its initialization process, such configuration information coming from two sources. Specifically, the controller address (on the IOP channel bus sent by the host computer) and down-line load capability are determined during reset by reading the state of jumpers located on the controller board (not shown).

The remainder of the configuration information for each communications line is passed to the multiplexer 10 from the software via transfers on the multi-purpose bus from the host computer via the input output processor (IOP), i.e., the configuration information is down loaded into the synchronous communications multiplexer. The number of parameters needed to configure each of the communications lines depends on the synchronous protocol chosen for the line. Since the protocol choice is made on a per-line basis, four sets of configuration information may be passed to the multiplexer.

BOP Operation: In this mode, an integral number of 8-bit bytes of data are transmitted and received. Each transmission frame is preceded by a flag character (a zero followed by six 1's followed by a zero, i.e., 01111110), and terminated by a 2-byte (16 bits) CRC and a closing flag. Address control information may be included in the frame. To ensure that flag characters do not occur in the information field, a zero is "stuffed" into the bit stream whenever five consecutive "1" bits occur. The inserted zero bit is subsequently "stripped" away by the receiver.

The following parameters are selectable for BOP:
 (a) CRC—CRC-CCITT-0/CRC-CCITT-1;
 (b) idle—flag/mark;
 (c) secondary address recognition—yes/no;
 (d) secondary address; and
 (e) configuration—half-duplex/full-duplex.

Remote Initial Program Load (IPL): Each port can be jumpered to support remote IPL, by means of which another computer (remote) can initiate an IPL sequence. When this option is selected, the following mode and parameters are invoked:
 (a) bit oriented protocol (BOP);
 (b) CRC-CCITT-1;
 (c) secondary address recognition—no; and
 (d) full-duplex.

A "system reset" and "remote IPL" are initiated following receipt of a message containing the following:
 (a) a valid flag character;
 (b) two characters containing hexadecimal FEFE;
 (c) valid CRC; and
 (d) a valid flag character.

Software programming of the synchronous communications multiplexer 10 of FIG. 1, and, in particular, the microprocessor 24 thereof, is accomplished in accordance with the following list of commands which are recognized by the multiplexer 10: No Operation (NOP), Line Control, Mode Control, Wait, Read, Write, Sense, Sense Byte Count, and Load WCS.

Execution of the NOP command causes "channel end/device end" status to be returned.

The Line Control command is used to modify port control lines. One byte of supplemental information is transferred with this command, the last three bits of the byte specifying one of the following six conditions: reset Request To Send, set Request To Send, reset Data Terminal Ready, set Data Terminal Ready, reset Ping-Pong Mode, and set Ping-Pong Mode. Ping-Pong mode refers to a transmitter queueing operation, by means of which data transmitted is forced to alternate between subchannels (Write commands from the software handler).

The default conditions of these parameters are: Data Terminal Ready—reset, Request To Send—reset, Ping-Pong mode—reset. Data Terminal Ready (DTR) can be set/reset by this command, or automatically set by the firmware on receipt of a ring when Auto-Answer is enabled. "Auto-answer" refers to the ability of the multiplexer to answer an incoming call (telephone call) and establish a line to transmit and receive data.

Request To Send (RTS) can be manually set/reset by this command, or automatically handled if Half-Duplex is set. In the "half-duplex" mode, RTS will be set at the beginning of a transmission, and reset at the end of transmission.

The Mode Control command (FFH) initializes a port to operate in accordance with a specific protocol. The number of supplemental bytes transferred with the command varies with the protocol and features desired.

In the bit protocol mode, byte 1 (ABCDEFFF) is utilized, where A denotes whether broadcast address recognition is enabled (0=disabled, 1=enabled), B reflects bit/byte protocol (0=BOP, 1=BCP), C is set to zero for bit mode, D denotes secondary address recognition (0=disabled, 1=enabled), E determines the character sent on idle (0=idle mark, 1=idle sync), and FFF determines the CRC control (000=CRC-CCITT-1, 001=CRC-CCITT-0, 010=X.25 MODE, and 011-111 are not used in the bit protocol mode).

With respect to the broadcast and secondary address recognition, the following criteria apply:

(a) Broadcoast Address Recognition set only—the quad sync firmware will load FFH into the secondary address register, Sense will reflect Secondary Address enable along with Broadcast Address, no secondary address supplied by software;

(b) Broadcast and Secondary Address set—Sense will reflect Secondary Address enable along with Broadcast Address Recognition enable, software must provide at least one byte of valid secondary address; and (c) Secondary Address Recognition set only—Sense will reflect Secondary Address Recognition enabled, software must provide at least one byte of valid secondary address.

The next byte, byte 2 (ABCDEEEE) specifies the internal baud rate and the configuration of the line, where A specifies half/full-duplex (0=full, 1=half), B determines ring enable/disable (0=disabled, 1=enabled), C specifies Auto-Answer disabled or enabled (0=disabled, 1=enabled), D determines if internal loop mode is set/reset (0=reset, 1=set), and EEEE specifies the baud rates as indicated in Table 4 below:

TABLE 4

| BINARY | HEX | BAUD RATE |
| --- | --- | --- |
| 0000 | 0 | 600 |
| 0001 | 1 | 1200 |
| 0010 | 2 | 2400 |
| 0011 | 3 | 4800 |
| 0100 | 4 | 7200 |
| 0101 | 5 | 9600 |
| 0110 | 6 | 19200 |
| 0111 | 7 | 56000* |
| 1000 | 8 | 50000* |
| 1001 | 9 | 40800* |
| 1010-1111 | A-F | (Not Used) |

*Unisync mode only.

Following byte 2, there may be up to four additional bytes of secondary address, bytes 3 through 6 (AAAAAAAB) where bits AAAAAAA1 specify each byte of the secondary address, and B signifies if the address is extended (0=extended to next byte, 1=last address byte).

It is to be noted that ring enable must be set for a ring from a modem to be recognized. If ring enable is reset, the line will be assumed to be dedicated and local, DTR will be set; and if the line is full-duplex, RTS will be set.

If Auto-Answer is reset, attention/channel end/device end status will be generated on ring detect. Sense will indicate ring received and DTR not set. If Auto-Answer is set, the same status will be returned, but "sense" will indicate ring received and DTR set.

"Sense" is a command that indicates to the multiplexer that it should input sense information—this includes error conditions that have been detected and any other status-type information.

Wait Command (OBH): The Wait command is intended for use in a IOP channel program designed to manage multiple buffer areas of CPU or microprocessor memory. Two bytes of information (software flags) are transferred with this command to the multiplexer. The multiplexer will return one of two possible status responses based on a zero check of these two bytes. If the bytes are non-zero, "channel end/device end" status is returned. The multiplexer interprets the non-zero condition as a wait. Note that the multiplexer will not return the "channel end/device end" status until a predefined period of time has elapsed. If the two bytes received are both zero, the multiplexer will return status modifier, channel end, and device end status. This will cause the channel to skip the next IOCD (Input/Output Command Doubleword) in the list. The status will be returned with no programmed delay.

Read Command (02H): This command causes received data to be transferred to main memory. The operation takes place in accordance with the mode command previously issued.

Write Command (01H): This command causes data to be transmitted outbound. The operation will occur in accordance with the parameters chosen in the mode command previously issued.

Transmitter Queueing Operation: To achieve high line throughput, a method referred to a transmitter queueing allows two transmitter subchannels to "funnel" data onto a single physical transmitter line.

The value of this method can best be understood when compared to a conventional system with a single subchannel. In a single subchannel system, the operation is started by issuing an I/O command (Write) to the multiplexer by the host computer. Upon receipt of this command, the multiplexer will initiate data movement from main memory to multiplexer memory to the transmission line. At completion of the data movement, the multiplexer will report the end condition by returning status and an interrupt. The multiplexer then remains idle while waiting for the next I/O command.

In a transmitter-queued system, the operation is also started by issuing an I/O command (Write). In this system, an I/O command can be issued to the alternate transmitter subchannel. The first subchannel data movement is described above. The efficiency is realized at the completion of the operation. Because the next I/O operation has been started in the alternate subchannel, data movement can proceed immediately on the transmission line, and a new I/O Write command can be issued to the first subchannel to wait completion of the alternate subchannel operation. This alternate command operation will continue, providing very high levels of transmission line efficiencies.

Sense Command (04H): The Sense command is used by the software to elicit information regarding possible error conditions, as well as mode information assigned to that line (sub-channel). The execution of a sense command will return up to six bytes of information as follows:

| Byte 1 -- channel/device status, where the bits have the following meanings |
| --- |
| Bit 0 — long block error |
| 1 — transmitter underrun, |
| 2 — receiver overrun, |
| 3 — data check (not used), |
| 4 — abort received, |
| 5 — bus parity error, |
| 6 — intervention required (not used), |
| 7 — command reject |
| Byte 2 -- modem status, where the meanings of the individual bits are: |
| 0 — clear to send (CTS) status, |
| 1 — data set ready status |
| 2 — data carrier detect status |
| 3 — ring interrupt, |
| 4 — clear to send (CTS) drop, |
| 5 — data set ready (DSR) drop, |
| 6 — data carrier detect (DCD) drop, |
| 7 — (not used); |
| Byte 3 -- line control status, where each bit means the following: |
| 0 — request to send (RTS) set, |
| 1 — data terminal ready (DTR) set, |
| 2 — ping-pong mode enable, |
| 3 — MM (loop mode), |
| 4 — Auto-Answer enable, |
| 5 — Ring enable, |
| 6 — IPL enable, |
| 7 — half-duplex; |
| Byte 4 -- USRT (Universal Synchronous Receiver Transmitter) parameters, where the bits have the following meanings: |
| 0 — CRC select, |
| 1 — CRC select, |
| 2 — CRC select, |
| 3 — idle control (sync or mark), |
| 4 — secondary address enable, |
| 5 — strip sync enable, |
| 6 — bit/byte mode (0/1), |
| 7 — broadcast address enable; and |
| Byte 5 -- internal baud rate, where the bits are used as specified below: |
| 0 — baud rate, |
| 1 — baud rate, |
| 2 — baud rate, |
| 3 — baud rate |
| 4-7 — receiver residual bit count (hexadecimal) |

Sense Transfer Count (14H): The Sense Transfer Count command causes the byte count of the last read operation to be transferred into main memory. This is used with channel programming for handling multiple buffers. If this command is issued to a transmitter sub-channel, then a byte count of FFFFH will be returned.

Load WCS (F1H): The receipt, by the controller, of a Load WCS (LWCS) command will initiate transfer of the firmware across the IOP and MP bus into the controller RAM 28. The format of the load information is as follows: the first byte of each record will contain a byte count followed by a 2 byte address, then data in accordance with the byte count, and finally a checksum byte. If the load information is verified, then channel end/device end (CE/DE) status will be returned to the IOP and control will be given to the WCS firmware. Otherwise, channel end/device end/unit check (CE/DE/UC) status will be returned. The software should then reissue the WCS load. In other words, the firmware corresponds to a microcode instruction set unique to a particular mode of data transfer, e.g., the communications protocol for that mode, and after the LWCS command is received by the multiplexer, the firmware or selectable software is executed by the microprocessor to, among other things, program or configure the modem control and line interface circuitry. The WCS command can be issued only to device 0.

Remote IPL: The Remote IPL capability is enabled by insertion of a jumper on the controller board. When this jumper is installed for a particular port, that port is—on occurrence of "power up", "interface clear", or "selected controller clear"—initialized with the following conditions: Bit-Oriented Protocol (BOP); CRC-CCITT-1; Secondary Address Recognition disabled; Broadcast Address Recognition disabled; Full-Duplex operation; Idle Mark; Data Terminal Ready (DR); Request to Send (RS); and Auto-Answer enabled.

Status Responses: The multiplexer 10 returns status responses, the meaning of each bit of each status response returned by the multiplexer being as follows: bit 7—Busy, bit 6—Status Modifier, bit 5—not used, bit 4—Attention, bit 3—Channel End, bit 2—Device End, bit 1—Unit Check, and bit 0—Unit Exception.

The following are possible status responses, along with the conditions that cause them. The abbreviations that are used are: CE—Channel End, DE—Device End, UE—Unit Exception, UC—Unit Check, ATTN—Attention, SM—Status Modifier, and B—Busy.

OCH (CE/DE): Normal ending status or error free operation.

ODH (CE/DE/UE): CRC error detected. (Note: This status only has meaning at the end of a read operation. It is not defined for other commands.)

OEH (CE/DE/UC): error condition detected. Sense data can report specifics. (Note: This status will not be returned when a CRC error is detected on a read.)

OFH (CE/DE/UC/UE): CRC error detected during execution of a Read command, and another error condition is also detected (reported in Sense Data). This status will be returned on a "write sub-channel" when the transmission is aborted, and the other "write sub-channel" was actively transmitting; when this condition is reported, the error condition detected on the other transmitting sub-channel is the cause of the abort.

1CH (ATTN/CE/DE): Modem Ring Received. If Auto-Answer is not set, Sense will indicate Ring-True. DTR-Not True. If Auto-Answer is set, Sense will indicate Ring-True, DTR-True.

4CH (SM/CE/DE): will cause Skip IOCD to be performed by the IOP.

50H (SM/ATTN): initiated remote IPL from this device.

8CH (B/CE/DE): for a half-duplex line, a Write command is issued when a Read is in progress, or a Read is issued with a Write in progress.

Long Block Status: The Long Block Status bit will be set by the IOP when a message is terminated and additional data is available from the multiplexer 10. All additional data in the buffer and all incoming data up to the ending flag for the frame being received will be purged. The sense TC will reflect only the data actually returned to the IOP.

Microprogramming

Hardware Addressing: The various components of the synchronous communications multiplexer 10 are accessed by the microprocessor 24 via an isolated addressing scheme. The use of input and output instructions of the microprocessor instruction set allows the microprocessor 24 to write to or read from the register of the peripheral integrated circuits. Below are the addresses chosen for the various components of the synchronous communications mutliplexer 10.

General Component Addresses: The following general addresses are used, specific registers being chosen by selecting a value for the X bit in the address, as shown in Table 5 below:

TABLE 5

| ADDRESS | ASSIGNMENT |
| --- | --- |
| 0XH | Synchronous Port 0 |
| 1XH | Synchronous Port 1 |
| 2XH | Synchronous Port 2 |
| 3XH | Synchronous Port 3 |
| 4XH | DMA Controller |
| 5XH | Interval Timer/Baud Generator |
| 6XH | Controller Address/EOI/Parity |
| 7XH | GPIB Controller |
| 8XH | CRC Generator/Checker Port 0 |
| 9XH | CRC Generator/Checker Port 1 |
| AXH | CRC Generator/Checker Port 2 |
| BXH | CRC Generator/Checker Port 3 |
| CXH | Modem Control/Status Port 0 |
| DXH | Modem Control/Status Port 1 |
| EXH | Modem Control/Status Port 2 |
| FXH | Model Control/Status Port 3 |

Register Addresses for Synchronous Ports: The following table gives the addresses for specific read and/or write addresses of each port. It is to be noted that the first hexadecimal character is defined according to port number, as in Table 5 above.

TABLE 6

| ADDRESS | OPERATION | INTERNAL REGISTER |
| --- | --- | --- |
| X0H | Read | Receive Data/Status (LS) |
| X1H | Read | Receive Data/Status (MS) |
| X2H | Read/Write | Transmit Data/Status (LS) |
| X3H | Read/Write | Transmit Data/Status (MS) |
| X4H | Read/Write | Parameter Control - PCSAR (LS) |
| X5H | Read/Write | Parameter Control - PCSAR (MS) |
| X6H | Read/Write | Parameter Control - PCR (LS) |
| X7H | Read/Write | Parameter Control - PCR (MS) |

DMA Controller Addressing: The internal registers (A0-A7) of the DMA controller 20 are addressed for read/write operations in accordance with a given address and the state of a flip-flop (F/F), as follows:

TABLE 6a

| ADDRESS | F/F | OPERATION | INTERNAL REGISTER |
| --- | --- | --- | --- |
| 40H | 0 | Read/Write | Read/Write A0-A7 in the Current Address Register For Channel 0 |
| 40H | 1 | Read/Write | Read/Write A8-A15 in the Current Address Register for Channel 0 |
| 41H | 0 | Read/Write | Read/Write W0-W7 in the Current Word Count Register for Channel 0 |
| 41H | 1 | Read/Write | Read/Write W8-15 in the Current Word Count Register for Channel 0 |

Table 6 is, it should be understood, a partially completed table, in that the table should be completed for addresses 42H, 43H, 44H, 45H, 46H and 47H, for both states (0 and 1) of the F/F. The second bit (x) of address 4xH indicates the A registers when it is even and the W registers when it is odd. The further bit F/F indicates the lower set of registers (A0-A7 or W0-W7) when it equals 0, and the upper registers (A8-A15 or W8-W15) when it is set to 1. Moreover, when the second bit of the address equals 2 or 3, channel 1 address registers or word count registers are accessed, while when the second bit equals 4 or 5, channel 2 registers are accessed, and so forth.

Table 6 should be further completed as follows:

TABLE 6b

| ADDRESS | F/F | OPERATION | INTERNAL REGISTER |
| --- | --- | --- | --- |
| 48H | — | Write | Write Command Register |
| 48H | — | Read | Read Status Register |
| 49H | — | Write | Write Request Register |
| 4AH | — | Write | Write Set/Request Mask Register |
| 4BH | — | Write | Write Mode Register |
| 4CH | — | Write | Clear Internal Flip-Flop (F/F) |
| 4DH | — | Write | Master Clear |
| 4DH | — | Read | Read Temporary Register |
| 4FH | — | Write | Write Mask Register |

IOP Channel Bus Interface Addressing: A scheme similar to that described above for the DMA controller 20 is established for the GPIB 14, as follows: address 70H = read data in register or write data from register, 71H = read interrupt status 1 register or write interrupt mask 1 register, 72H = read interrupt status 2 register or write interrupt mask 2 register, 73H = read serial poll status register or write serial poll mode register, 74H = read address status register or write address mode register, 75H = read command pass-through register or write auxiliary mode register, 76H = read address 0 register or write address 0/1 register, 77H = read address 1 register or write EOS register. In the latter regard, it is to be understood that the particular operation (read/write) is designated and is taken into account with the address.

CRC Generation and Checking Logic Addressing: The addressing for the CRC generation and checking logic proceeds according to the following table:

TABLE 7

| ADDRESS | OPERATION | INTERNAL REGISTER |
| --- | --- | --- |
| X0H | Read | Read Character Register |
| X0H | Write | Write Character Register if MR1,0 do not equal 00, or write character class array if MR1,0 equal 00 |
| X1H | Read | Read Status Register |
| X1H | Write | Write Command Register |
| X4H | Read | Read Mode Register |
| X4H | Write | Write Mode Register |
| X5H | Read | Read BCC - Upper/Lower |
| X5H | Write | Write BCC - Upper/Lower |

Interval Timer/Baud Generator Addressing: The interval timer/baud rate generator 30 is addressed at two locations, a control port and a data port, as follows:

TABLE 8

| ADDRESS | OPERATION | INTERNAL REGISTER |
| --- | --- | --- |
| 50H | Read | Transfer Data Register Addressed by Data Pointer to Data Bus |
| 50H | Write | Transfer Data Bus to Data Register Addressed by Data Pointer |
| 51H | Read | Transfer Status Register to Data Bus |
| 51H | Write | Transfer Data Bus to Command Register |

End Or Identify (EOI) Control Addressing: The EOI logic circuitry 16 is controlled by write commands to address 60H in the following manner:

TABLE 9

| ADDRESS | OPERATION | DATA | FUNCTION |
|---|---|---|---|
| 60H | Write | 17H | Enable EOI Detection |
| 60H | Write | 07H | Disable EOI Detection |

Controller Address and Downline Load Remote (IPL): The controller address is read from a set of four jumpers as a hex code between 00H and 0FH. The address is read by performing a port read to address 60H. The address will be contained in the lower four bits of the data word obtained. The upper four bits will contain information showing which ports are configured for downline load (remote IPL). Addressing is carried out in accordance with the following scheme:

TABLE 10

| ADDRESS | OPERATION | FUNCTION |
|---|---|---|
| 60H | Read | Controller Address (Lower 4 Bits) |
| 60H | Read | Downline Load (Upper 4 Bits) |

Bus Parity Reset: The bus parity error interrupt is reset by writing to location 60H in accordance with the following: address=60H, operation=WRITE, data=01H, function=reset bus parity interrupt.

Modem Control Registers: The four sync communications control registers are write-only facilities which allow the firmware to change the modem control signals for each communications line. The registers for ports 0 through 3 are accessed by performing a "port write" to addresses C0, D0, E0 and F0, respectively. The format for these registers is given in the following table:

TABLE 11

| BIT 7 | BIT 6 | BIT 5 | BIT 4 | BIT 3 | BIT 2 | BIT 1 | BIT 0 |
|---|---|---|---|---|---|---|---|
| TXEN | RXEN | RIEN | TIEN | MM | N/U | DTR | RTS |

Where TXEN = Transmitter Enable, RXEN = Receiver Enable, RIEN = Ring Enable, TIEN = Transmitter Interrupt Enable, MM = Maintenance Mode, DTR = Data Terminal Ready, RTS = Request To Send, and N/U = (Not Used).

Modem Status Registers: The four controller modem status registers are read-only facilities which allow the firmware to ascertain the status of each port. These registers are accessed via a "port read" to addresses C0, D0, E0 and F0 for ports 0–3, respectively. The following bits are defined:

TABLE 12

| BIT 7 | BIT 6 | BIT 5 | BIT 4 | BIT 3 | BIT 2 | BIT 1 | BIT 0 |
|---|---|---|---|---|---|---|---|
| RXACT | TXACT | TSU | RX-STAT | RI | DCD | DSR | CTS |

Where RXACT = Receiver Active, TXACT = Transmitter Active, TSU = Transmitter Underrun, RXSTAT = Receiver Status Available, RI = Ring In, DCD = Data Carrier Detect, DSR = Data Set Ready, and CTS = Clear To Send.

Interrupt Level Assignments: The following list gives the micro-interrupt level assignments in the synchronous communications multiplexer 10. The lowest level (on a numerical basis) represents the highest priority.

TABLE 13

| LEVEL | ASSIGMENT |
|---|---|
| 0 | Bus Parity Error |
| 1 | Not Assigned |
| 2 | Not Assigned |
| 3–6 | Ports 0–3 — Transmitter Empty |
| 7–9, A | Ports 0–3 — Receiver has Data |
| B–E | Ports 0–3 — Transmitter Underrun |
| F, 10–12 | Ports 0–3 — CRC Interrupt |
| 13–16 | Ports 0–3 — Receiver Status |
| 17–19, 1A | Ports 0–3 — Ring Received |
| 1B | Interval Timer Interrupt |
| 1C | Not Assigned |
| 1D | Transfer Complete Interrupt (Unisync) |
| 1E | GPIB Interrupt |
| 1F | EOI Interrupt |

Sub-channel Allocation: There are a total of sixteen (16) sub-channels in the synchronous communications multiplexer. Four sub-channels per port are allocated, two for transmission and two for recieve. The two transmission sub-channels per port allow higher throughput. Thus, a message will be sent from one sub-channel and, while status is being posted, the other sub-channel can be transmitting. Each port has two receive sub-channels. One sub-channel handles only information frames and the second sub-channel handles supervisory operations needed for maintaining link inteegrity. The following table indicates the sub-channel allocations for the synchronous communications multiplexer:

TABLE 14

| SUB-CHANNEL | FUNCTION | PORT |
|---|---|---|
| 0 | Information Frame Receive | 0 |
| 1 | Supervisory | 0 |
| 2 | Transmit A | 0 |
| 3 | Transmit B | 0 |
| 4–7 | Information Frame Receive, etc. | 1 |
| 8–9, A–B | Information Frame Receive, etc. | 2 |
| C–F | Information Frame Receive, etc. | 3 |

Multi-Purpose (MP) Bus Transfers: Information transfers can be initiated by either the input/output processor (IOP) or the synchronous communications multiplexer (SCM). In the following sections, a description of each type of transfer is given.

Control Signal Transfer (EOM or DCR): This transfer is initiated by the IOP and ultimately by the host computer. There are two types of control signal transfers used. One is used to signal end of message (EOM), and the other is for device clear (DCR). The End of Message (EOM) control signal transfer is used by the IOP to signal that the transfer for the addressed device is complete. The Device Clear (DCR) transfer causes a specific device (multiplexer port) to be cleared. Each of these control signals will be passed to the MPU 24 by the GPIB 14. The control signals will be available in the comman pass-through register, and their presence will be indicated by the status bit in the interrupt status register 1. The device address, however, is passed to the MPU as data.

Controller Reset Transfer (SCC): This transfer is initiated by the IOP. It requests the multiplexer to reset itself. The SCC control signal will be interpreted by the GPIB 14, and its occurrence will be indicated to the MPU 24 by the setting of the DEC status bit in the interrupt status register 1.

Command Transfer (ESC): This sequence is initiated by the IOP. It is used to transfer commands to the synchronous communications multiplexer. The ESC control signal will be passed to the MPU 24 in the command pass-through register. Both the command byte and the device address will be passed as data.

Service Request: This sequence of transfers is initiated by the synchronous communications multiplexer 10. It is used to request service from the IOP.

MP Bus Data Transfer

Output Transfer (Write): Various bus cycles occur during an output from the IOP to the synchronous communications multiplexer 10 via the MP bus. The EOI line is driven by either the IOP or the synchronous communications multiplexer 10 on the last data byte transferred to indicate the end of the current block transfer.

Input Transfer (Read): During a data transfer from the SCM to the IOP via the MP bus (inbound transfer), the EOI line is driven by either the IOP or the synchronous communications multiplexer 10 to indicate the end of the current block transfer.

The composition and operation of the synchronous communications multiplexer 10 of FIG. 1 will now be described in more detail with reference to the figures of the drawings.

Figure 2:
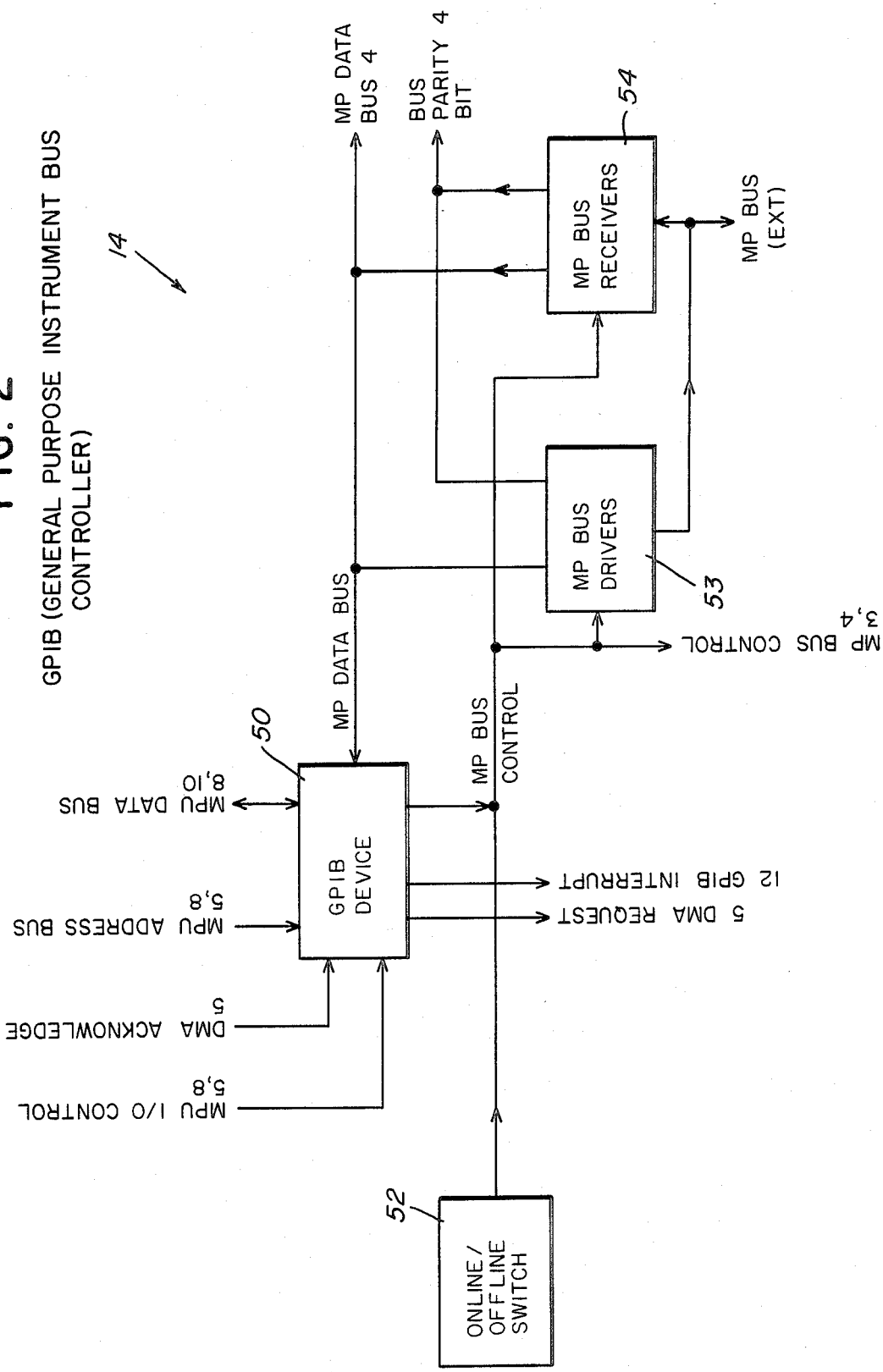
FIG. 2 is a diagram of the general purpose instrument bus controller (GPIB) 14 of FIG. 1.

As stated above, FIG. 2 is a diagram of the GPIB 14 of FIG. 1. As seen therein, the GPIB 14 generally comprises a GPIB device 50, an online/offline switch 52, MP bus drivers 53, and MP bus receivers 54. The latter arrangement, as depicted in FIG. 2, constitutes an interface to the multi-purpose (MP) bus. More specifically, the GPIB controller 14 coordinates control information and data transfer between the IOP (input/output processor) and the SCM (synchronous communications multiplexer).

Further describing the GPIB 14, MP bus activity is controlled by the IOP of the overall system (not shown) and hence by the host computer. The IOP sends control information to the SCM 10 (FIG. 1) by placing the information on data lines, and setting certain MP bus control lines that indicate the presence of control information on the bus. THe GPIB 14 (FIG. 2) responds by accepting the information, and then interrupts the MPU 24 (FIGS. 1 and 8) with a status indicator, indicating that control information is available.

The MPU 24 (FIGS. 1 and 8) indicates that it is ready to receive data from the IOP, or to send data or status information to the IOP, by instructing the GPIB 14 (FIG. 2) to set a Service Request control line on the MP bus. The IOP (not shown) responds by allowing the GPIB 14 (FIG. 2) to transfer the data or status information.

Figure 8:
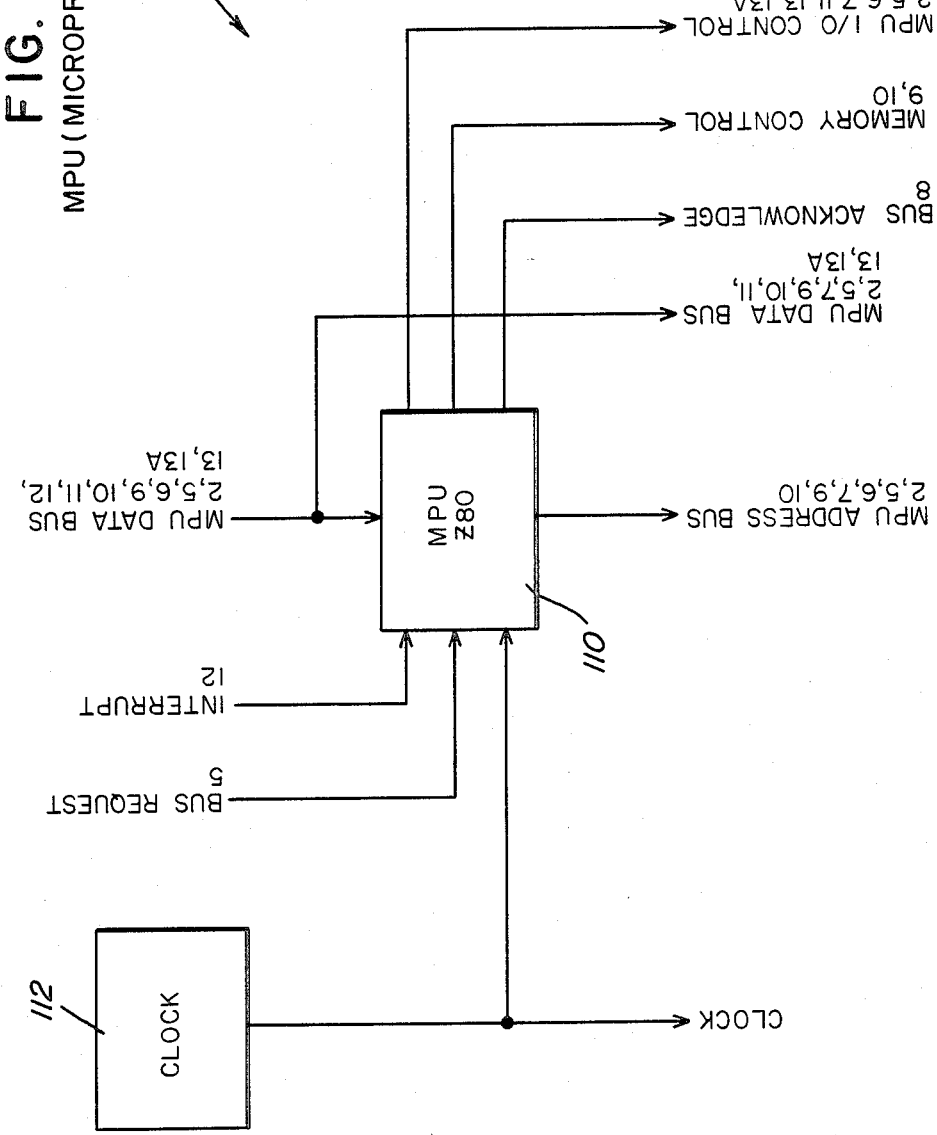
FIG. 8 is a diagram of the configuration of the microprocessor unit 24 of FIG. 1.

When status is to be transferred, an interrupt (see interrupt logic 36 of FIG. 12) is generated by the MPU 24 (FIG. 8). The MPU 24 responds by providing a status byte as an output.

Figure 10:
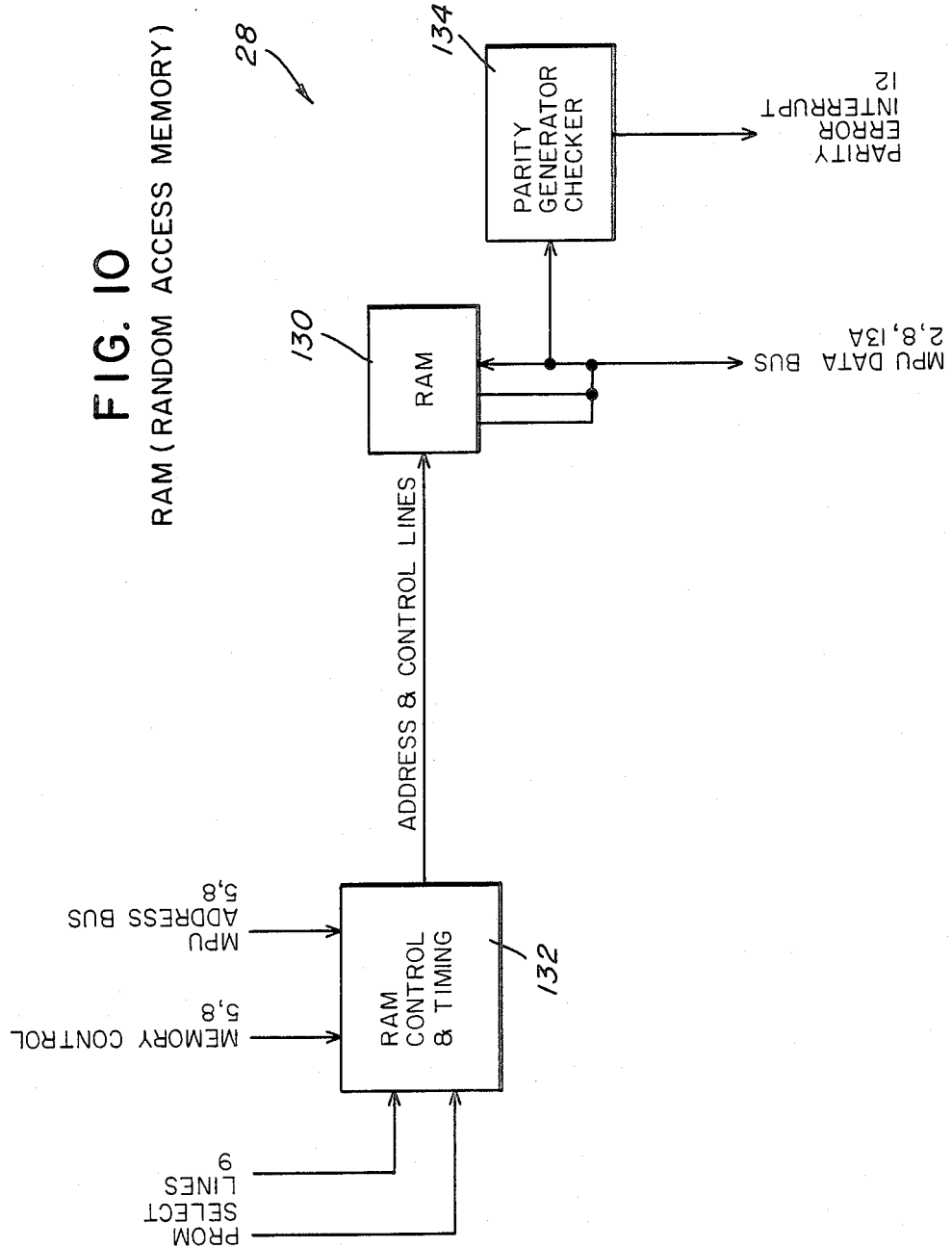
FIG. 10 is a diagram of the RAM 28 of FIG. 1.

When data is to be transferred outbound, the GPIB 14 performs a DMA (direct memory access—see FIGS. 5A and 5B) operation. A DMA request is generated for each byte to be transferred. The DMA controller 20 (FIGS. 1 and 5A) responds by returning an acknowledge signal, and transfers the data byte between the GPIB 14 and internal RAM (random access memory) 28 (FIGS. 1 and 10). The GPIB 14 controls the control line "handshake" for transfers on the MP bus.

The online/offline switch 52 of the GPIB 14 (FIG. 2) allows the SCM 10 (FIG. 1) to be switched to an inactive (offline) state. As also indicated in FIG. 2, and as indicated above, it is the GPIB device 50, within the overall GPIB controller 14, which generates the DMA request and GPIB interrupt control signals. Furthermore, the MPU I/O (input/output) control signals, the DMA acknowledge signal, the MPU address information, and the MPU data are also received by the GPIB device 50. Finally, transmission and reception of MP data via the MP bus drivers 53 and MP bus receivers 54, respectively, are controlled by the GPIB device 50, which generates the MP bus control signals provided, inter alia, to the MP bus drivers 53 and MP bus receivers 54. Bus parity bits are provided by the MP bus receivers 54 to the MP bus drivers 53.

Figure 3:
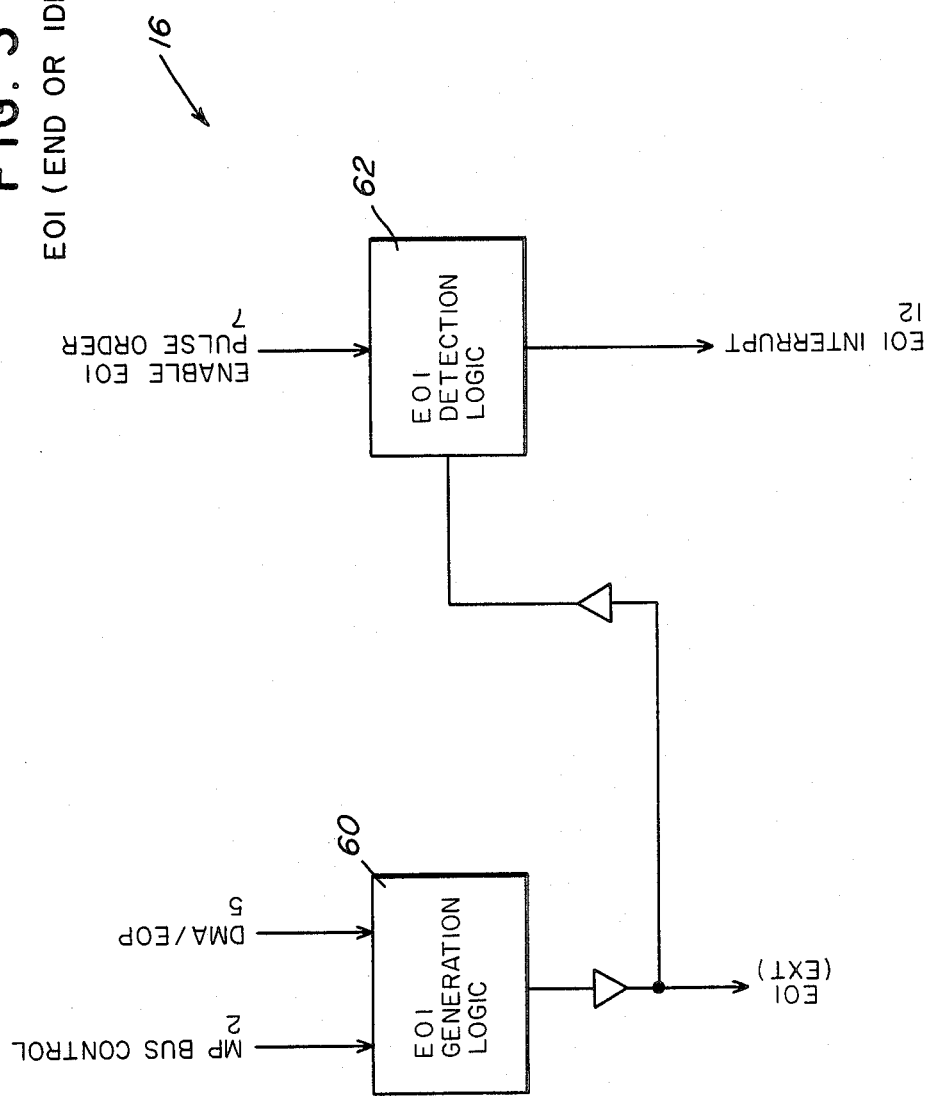
FIG. 3 is a diagram of the EOI ("END OR IDENTITY" signifying end of a data burst) logic 16 of FIG. 1.

FIG. 3 is a diagram of the EOI logic 16 of FIG. 1. As seen therein, the EOI logic 16 generally comprises the EOI generation logic 60 and the EOI detection logic 62.

EOI (end or identify) is the control signal used on the MP bus to indicate the end of a data burst. The EOI generation logic 60 is capable of generating the EOI signal to indicate completion of the current data burst. The EOI detection logic senses the occurrence of EOI, whether generated by the multiplexer 10 or generated by the IOP. Upon detection of EOI, an interrupt (see the interrupt logic 36 of FIG. 12) is generated by the MPU 24 (see FIGS. 1 and 8), and the occurrence of the EOI interrupt allows the MPU 24 to perform an orderly termination of the data burst.

The EOI generation logic 60 sets the EOI when the DMA controller 20 (FIG. 5) indicates that it has reached the end of operation. The EOI signal is reset after it has been recognized on the MP bus.

The EOI detection logic 62 is selectively enabled during a data transfer (see ENABLE EOI PULSE ORDER in FIG. 3). When enabled, this causes monitoring of the EOI to take place. When the EOI is sensed, the MPU 24 (FIG. 8) selectively disables the EOI detection logic 62 until another data burst is started. This selective enabling and disabling insures that the EOI interrupt will only be generated so as to signal the end of a data burst for this particular synchronous communications multiplexer, and indications for other multiplexers will be ignored.

FIG. 4 is a diagram of the parity logic 18 of FIG. 1. As seen therein, the parity logic 18 includes a parity generator/checker 70 and a parity error interrupt device 72.

The parity logic 18 generates a parity bit (odd parity) for each data byte outbound to the MP bus, and checks for correct parity on data inbound from the MP bus. If incorrect parity is sensed on the inbound data, a parity error interrupt is generated by parity error interrupt device 72, and is transmitted to the MPU 24 (FIG. 8). This interrupt will cause the error recovery procedures to be invoked by the MPU 24. Parity checking is performed by the parity generator/checker 70 in accordance with its two inputs, BUS PARITY BIT 2 and MP DATA BUS 2, respectively. A parity error is indicated via output ERROR provided by the checker 70 to the parity error interrupt device 72. Parity generator checker 70 and parity error interrupt device 72 are conventional devices, well known to those of skill in the art, and readily available in the marketplace.

FIG. 5A is a diagram of the direct memory access (DMA) controller 20 of FIG. 1, while FIG. 5B is a timing diagram relating to the data transfer cycle of the DMA controller 20.

As seen in FIG. 5A, the DMA controller 20 basically comprises a DMA controller unit 80 and an address latch 82. The DMA controller unit 80 is implemented, in a preferred embodiment, by the AMD 9517A device, which is a conventional device available in the marketplace.

The DMA controller unit 80 controls data transfer between the RAM 28 (FIGS. 1 and 10) and the I/O devices. Two I/O devices support DMA transfers, the GPIB 14 and the port 3 (element 41 in FIG. 1). Prior to executing a DMA transfer, the MPU 24 must specify to the DMA controller 20 the starting RAM address of the transfer and the byte count of the transfer.

A DMA transfer occurs when the I/O device sets the DMA request transfer signal, provided to the DMA controller unit 80 (FIG. 5A). The DMA controller unit 80 then sets the bus request (see output BUS REQUEST of controller unit 80) to the MPU 24. The MPU 24 relinquishes control of the MPU data bus and the MPU address bus, and returns a Bus Acknowledge signal to the DMA controller unit 80. The DMA controller unit 80 then performs a data transfer, the timing of which is shown in FIG. 5B.

A 16-bit address is used to specify the RAM address. Referring to FIG. 5B, the upper eight bits (bits 8–15) of this address are set on the data bus by the DMA controller unit 80 during period S2. There bits are then strobed into an external register, and gated onto the MPU address bus. The lower eight bits (bit 0–7) of the address are gated directly onto the MPU address bus during periods S2–S4.

The I/O device is "addressed" by returning the DMA acknowledge signal. This technique requires that the I/O device recognize that it is being granted the DMA cycle when the DMA Acknowledge signal is true. Depending upon the direction of the data transfer, the DMA controller unit 80 will initiate a RAM read operation and an I/O write operation, or a RAM write operation and an I/O read operation. At the completion of the operation, the DMA controller unit 80 resets the Bus Request line, thereby allowing the MPU 24 to continue execution. Address latch 82 merely serves to latch an address provided to or from the DMA unit 80 (see input/output MPU DATA BUS), and provides the latched address either to the DMA controller unit 80, or as output MPU ADDRESS BUS.

FIG. 6 is a diagram of the device select 22 of FIG. 1. As seen therein, the device select unit 22 comprises device address switch unit 90, device select logic 92 and port clock multiplexer 94, and actually performs the functions of device selection, device addressing, and port clocks selection.

The device select logic 92 decodes the MPU address bus information (provided as an input thereto) so as to generate device select signals on the device select lines as shown. These signals are used when the MPU 24 programs the I/O devices using IN or OUT instructions.

Device address switches 90 identify the address used by the IOP when signaling the multiplexer 10 to send or receive data on the MP bus. The MPU 24 reads these switches, via MPU data bus connected to the device address switches 90, when the controller is "powered up" or reset, and loads the address specified into the GPIB 14 (FIGS. 1 and 2).

Port clock multiplexer 94 is used during diagnostic operations to provide a serial transmit and receive clock to the ports 38–41 (FIG. 1) in a manner independent of the externally connected devices. During normal operation, the externally connected devices are expected to provide the transmit and receive clocks, and the port clock multiplexer 94 is not needed.

Figure 7:
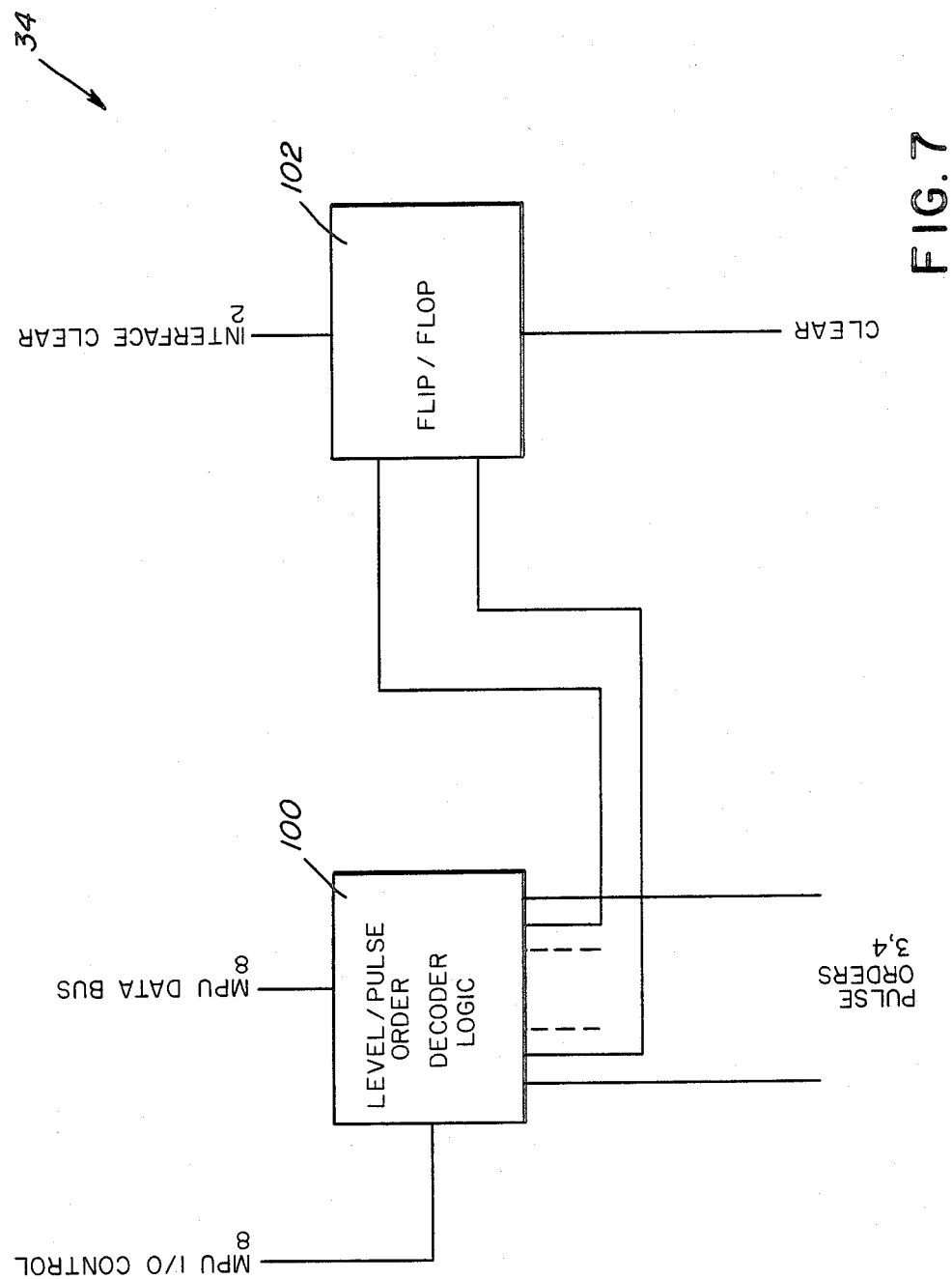
FIG. 7 is a diagram of the level/pulse orders 34 of FIG. 1.

FIG. 7 is a diagram of the level/pulse orders 34 of FIG. 1. As seen in FIG. 7, the level/pulse orders 34 comprises two elements: a decoder 100 and a flip/flop 102. The decoder is an 74LS138. The flip/flop is an 74LS74.

The level/pulse orders 34 allows the MPU 24 to set and reset, and to enable interrupt signals. A level order is provided to allow the MPU 24 to hardware clear the logic in the synchronous communications multiplexer.

Level order 0 is used to turn on a light emitting diode (LED). Pulse order 1 is used to reset the parity error flip/flop 72. Pulse order 2 is applied to flip/flop 102 to initiate a hardware reset of the SCM. Pulse order 3 is applied to DMA logic 80 to reset the "transfer complete interrupt". Level order 4 is applied to DMA logic 80 to inhibit the DMA request from the GPIB. Level order 5 is used to terminate the hardware reset condition initiated by pulse order 2. Level order 6 is applied to the DMA logic 80 to enable the DMA request from the GPIB. Level order 7 is used to enable the EOI detection logic 62.

FIG. 8 is a diagram of the configuration of the microprocessor unit (MPU) 24 of FIG. 1. As seen in FIG. 8, the MPU 24 comprises a microprocessor unit 110, which is preferably a Zilog Z80A, and a clock unit 112.

The MPU device 10 is the primary control element in the SCM 10 of FIG. 1. The MPU device 110 is a general microprocessor unit, the programs executed by the MPU 110 residing either in PROM 26 (FIGS. 1 and 9) or RAM 28 (FIGS. 1 and 10). These programs control the movement of data between the GPIB 14 (FIGS. 1 and 2) and the ports 38–41 (FIGS. 1 and 13A). The MPU 110 also handles the parameters (line control/mode control) specified by the "host" resident software stored in the RAM but supplied via the MP bus by the host computer.

The MPU 110 executes four different types of commands: control commands, sense commands, write commands, and read commands.

Control commands are issued to specify the communication line parameters. These parameters include bit-oriented mode, byte-oriented mode, bits per character, sync character, end of message characters, maximum transfer count, baud rate, error detection algorithm, and other operating mode characteristics. Subsequent read and write commands are processed in accordance with these parameters.

Sense commands provide extended status information. Extended status information includes any error or exception conditions, and the current settings of the modes specified by the control commands.

Write commands signal the MPU 24 to transfer data outbound to the ports 38–41. The MPU 24 first instructs the GPIB 14 to transfer data from the MP bus to the RAM 28 with the assistance of the DMA. When all data has been transferred to the RAM 28, the MPU 24 initiates an output operation to the port (ports 38–41). The output to the port proceeds in one of two ways: (1) when operating in the "quad" mode of operation, an interrupt is generated by the port for each character required, and the MPU 24 responds by providing a character as an output to the port; (2) when operating in the "uni" mode, the MPU 24 loads the address and byte count of the data block to be transferred into the DMA controller 20, and the MPU 24 then initializes data transfer to the port, and allows the operation to proceed as a DMA operation.

If a "ping-pong" mode of operation is specified, two write commands can be activated simultaneously. Each is issued by the "host" software to the different logical subchannel of the synchronous communications multiplexer 10. The data transferred to the port will be between the two logical subchannels. This technique (known as "transmitter queueing") allows messages to be transmitted with minimum time between message blocks. The result of "transmitter queued" operation is minimum communication line overhead and maximum communication line efficiency.

Read commands signal the MPU 24 to transfer data inbound to the MPU bus. If a message has previously been received and is located in the RAM 28, it will immediately be transferred to the MP bus. If a message has not been received, the next inbound message will be transferred in response to the read command.

The MPU 24 communicates with other elements in the synchronous communication multiplexer 10 across the MPU data bus and the MPU address bus. The MPU address bus, together with memory control or MPU I/O control, specifies the device or devices, data being transferred both into and out of the MPU data bus.

Several elements in the synchronous communications multiplexer 10 are capable of generating interrupts to the MPU 24. In response to the interrupt, the MPU 24 transfers program execution control to an interrupt handler routine resident in the PROM 26 or RAM 28. This provides for timely response to events occurring at the I/O devices.

The DMA controller 20 uses the MPU address bus, the MPU data bus, the memory control and the MPU I/O control when performing a DMA data transfer (see FIGS. 5A and 5B). To gain control of these busses and the control lines, the DMA controller 20 sets Bus Request provided to the MPU 24. After the busses and control lines are made available, the MPU 24 returns Bus Acknowledge to the DMA controller 20. This signals DMA controller 20 to proceed with the operation. At the completion of the DMA data transfer, the DMA controller 20 resets Bus Request, and this signals the MPU 24 to proceed with its operation.

Figure 9:
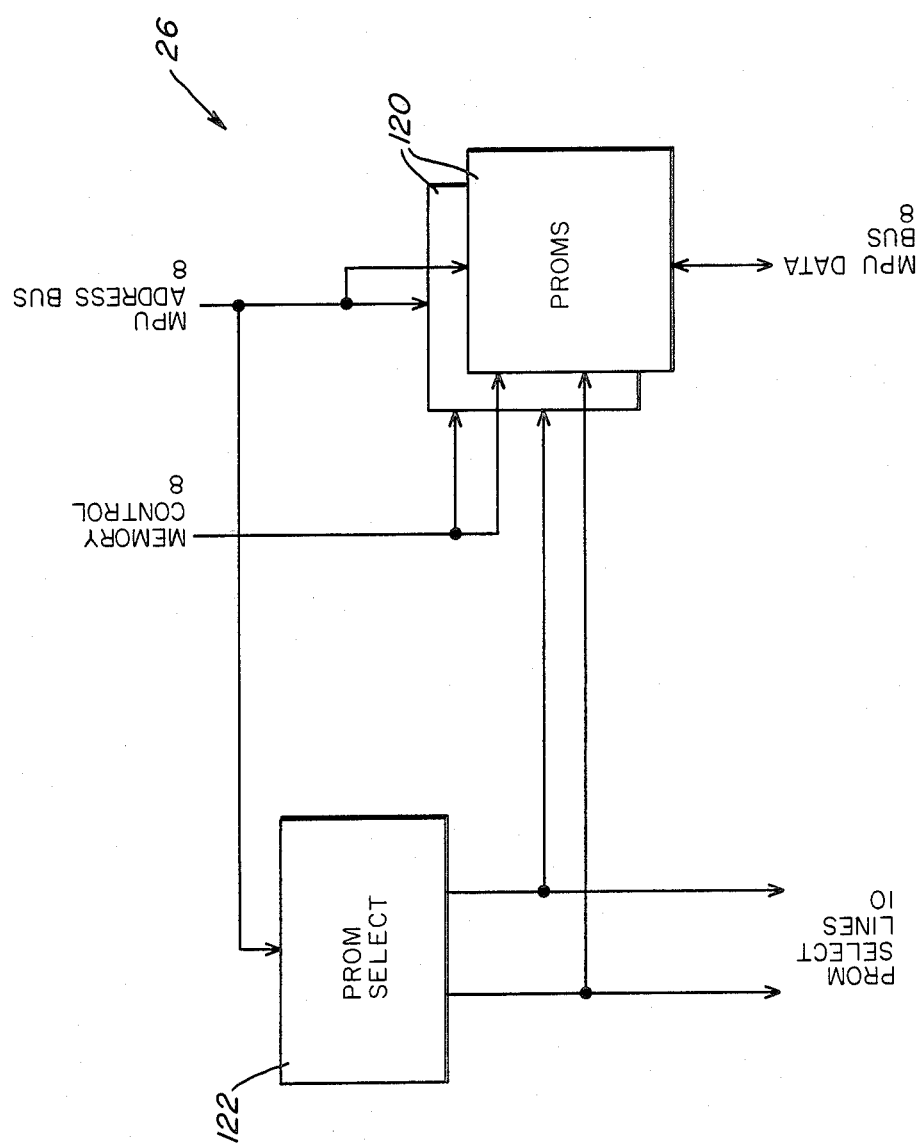
FIG. 9 is a diagram of the programmable read-only memory (PROM) 26 of FIG. 1.

FIG. 9 is a diagram of the programmable read-only memory (PROM) 26 of FIG. 1. As seen therein, the PROM 26 basically comprises individual PROM's 120 and PROM select device 122.

The PROM 26 contains non-alterable microcode. Included in this microcode are power up/reset routines, MP bus handling routines, and microcode load routines i.e., executive routines.

The power up/reset routines initialize the elements in the synchronous communications multiplexer 10, and condition the multiplexer 10 to receive a microcode load sequence i.e., in preparation for down loading of the software.

The MP bus handling routines control and respond to the GPIB 14 (FIGS. 1 and 2). The routines are available to the operating microcode, loaded in the RAM 28 (FIGS. 1 and 10) during a microcode load operation (down loading), so as to handle MP bus transactions.

The microcode load routines in the PROM recognize a microcode load command from the "host" resident software supplied by the host computer. The MPU 24 (FIGS 1 and 8) loads the new microcode into the RAM 28 (FIGS. 1 and 10), and transfers control to the new code at the end of the load operation.

FIG. 10 is a diagram of the RAM 28 of FIG. 1. As seen therein, the RAM 28 generally comprises RAM bank 130, RAM control and timing unit 132, and parity generator checker 134.

The microcode is loaded into and executed from the RAM 28. A total of 64K bytes of RAM are available for the storage of instructions and data.

The RAM banks 130 or memory elements form the storage section of the RAM 28, the RAM bank 130 containing nine memory elements. Eight of these elements store the instruction and data bytes, with the ninth element storing a parity bit used to insure data integrity.

The RAM control and timing logic 132 converts the memory control lines and the MPU address bus into address and control lines conforming to the requirements of the RAM banks or elements 130. The select lines of the PROM 26 (FIGS. 1 and 9) signal the RAM control and timing logic 132 that a PROM access is in progress. The RAM control and timing logic 132 is disabled during PROM accesses.

The parity generator/checker logic 134 generates a parity bit during RAM writes, and checks for odd parity during RAM reads. If even parity is detected on a RAM read, a parity error interrupt is generated to the MPU 24. The MPU 24 must respond to this error condition with an error recovery procedure.

Figure 11:
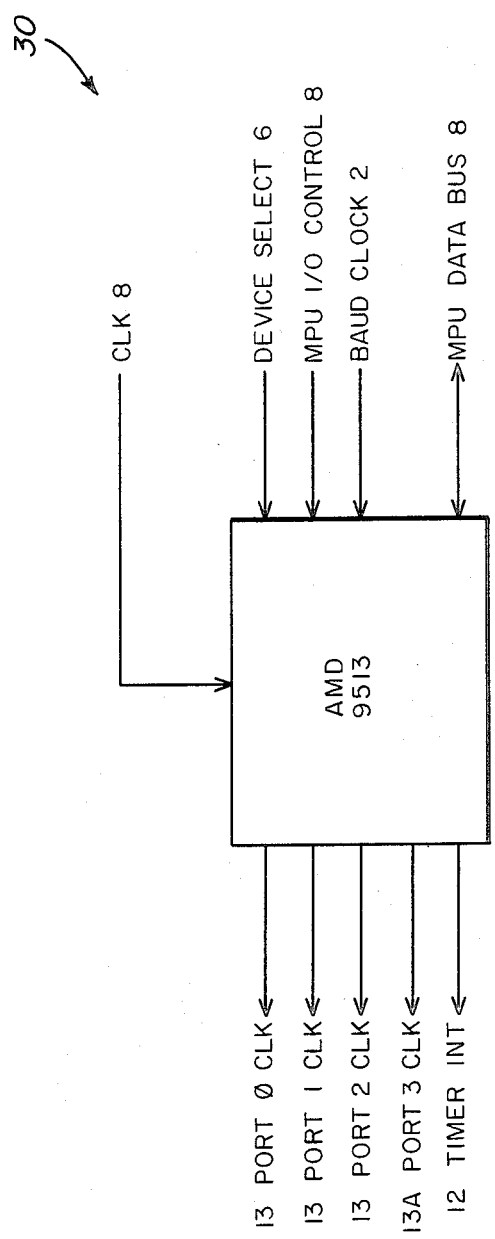
FIG. 11 is a diagram of the interval timer and baud generator 30 of FIG. 1.

FIG. 11 is a diagram of the interval timer and baud generator 30 of FIG. 1. As indicated therein, the interval timer/baud rate generator 30 preferably comprises an AMD 9513 device. This device contains five individual timers, as is well known in the art. Each internal timer can be programmed to operate in a number of different modes. The timers can be programmed to accept their inputs from an internal oscillator, or from one of several external sources. Gate inputs are available to enable and disable the timers. Each timer output can be selected to be a pulse output, a square wave, or a complex duty cyle waveform.

The synchronous communications multiplexer 10 uses one of the timers as an interval timer. The output of this timer generates an interrupt (TIMER INT.) to the MPU 24 at regular time intervals. The MPU 24 uses this interrupt for its timed functions. The input selected for this timer is the MPU clock.

The remaining four timers are used to generate baud rate clocks for the ports 38-41. Each of these timer inputs is selected in accordance with the baud clock, and the timers are then set according to the baud rate selected for the ports. The outputs of these timers are said to generate a square wave, the square wave being available at the port interface (see FIG. 13A) and at the port clock select multiplexer (see FIG. 6).

Figure 12:
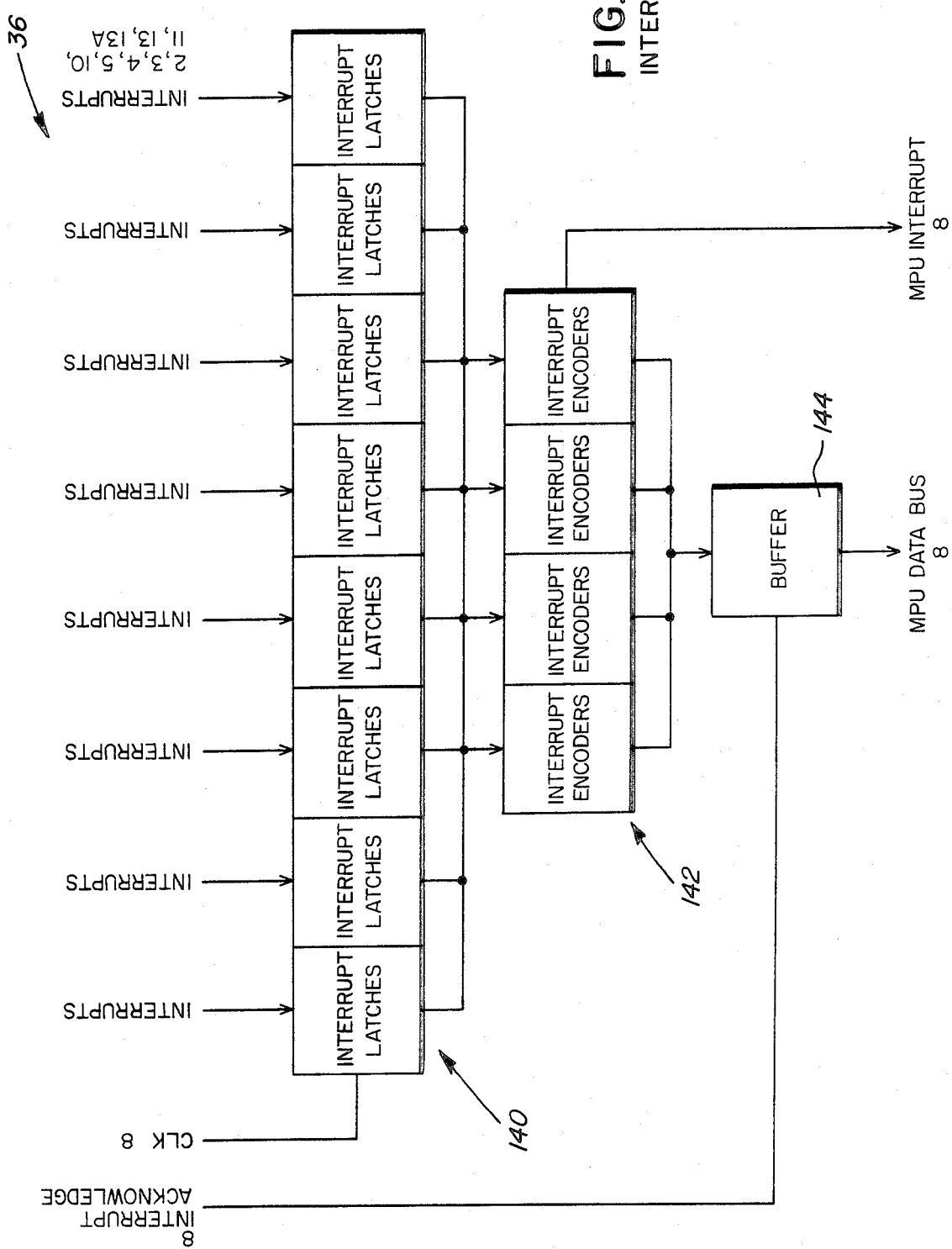
FIG. 12 is a diagram of the vectored interrupt logic 36 of FIG. 1.

FIG. 12 is a diagram of the vectored interrupt logic 36 of FIG. 1. As seen therein, the interrupt logic 36 comprises various interrupt latches 140, interrupt encoders 142, and a buffer 144.

The interrupt logic 36 latches (via interrupt latches 140) the condition of the interrupt lines, and encodes the highest priority active interrupt in a form which is recognizable by the MPU 24, and to which the MPU 24 can respond. Interrupt logic 36 sets the MPU interrupt lines, via interrupt encoders 142 and the output MPU INTERRUPT, when any interrupt is active.

The condition of the interrupt lines is latched by the interrupt latches 140, with the encoders 142 recognizing the highest level of interrupt currently active. This interrupt is converted to a unique 7-bit number, and the MPU interrupt line is set. When the MPU 24 recognizes the interrupt, it acknowledges the interrupt, and provides the interrupt level (the 7-bit number) as an input from the data bus. The number identifies the memory location which contains the vector pointing to the interrupt handler. The MPU 24 passes control to the interrupt handler, which proceeds to service the interrupting condition.

FIG. 13A is a diagram of the communication ports 0, 1 and 2 of FIG. 1, while FIG. 13B is a diagram of the communication port 3 of FIG. 1. As seen in FIG. 13A, each port 38-40 consists of a Signetics 2652 USRT (Universal Synchronous Receiver Transmitter) 150, discrete modem control logic 152, a polynomial generator checker (CRC) 154 (which is preferably a Signetics 2653 polynomial generator checker), port drivers 156, and port receivers 158.

The USRT 150 performs the serial-to-parallel and parallel-to-serial conversion of data. The mode of conversion is programmed in the USRT 150 by the MPU 24. Mode parameters that can be programmed include broadcast address recognition, bit-oriented mode or byte-oriented mode, idle pattern (synch or mark) and error control (CRC VRC).

Ports 0, 1 and 2 are configured for operation at speeds below 20,000 bits per second. Data transfer is accomplished by the ports generating an interrupt to the MPU 24 for each data byte to be transferred. The MPU 24 interrupt handler is responsible for transferring data and managing the message.

The modem control logic 152 handles the following port interface lines: RING DETECT, REQUEST TO SEND, DATA TERMINAL READY, DATA CARRIER DETECT, DATA SET READY, and CLEAR TO SEND. The occurrence of the RING DETECT signal causes an interrupt to the MPU 24. The remaining signals are either set/reset or monitored by the MPU 24 during normal operation.

The CRC circuit 154 has been included to handle the IBM BISYNC BCC (Block Check Character). Upon detection of an error, this circuit 154 will generate an interrupt to the MPU 24.

The port drivers 156 and port receivers 158 convert the internal signal levels (TTL compatible) to EIA RS423-compatible signals.

It will be noted, from FIG. 13A, that ports 1 and 2 (reference numerals 160 and 162, respectively) are understood to be configured in the same manner as port 0 (consisting of elements 150, 152, 154, 156 and 158). It is also to be understood, with reference to FIG. 1, that the modem control and line interface 32 corresponds to the modem control logic 152 of each port in FIG. 13A, and that the drivers and receivers 42-45 in FIG. 1 correspond to the port drivers 156 and port receivers 158 of each port in FIG. 13A.

As seen in FIG. 13B, port 3 (reference numeral 41 in FIG. 1) comprises USRT device 170, modem control logic 172 (included within modem control and line interface 32 of FIG. 1), CRC device 174 and port drivers 176 and port receivers 178 (included within driver and receiver 45 of FIG. 1).

Basically, port 3 is configured and operates in the same manner as ports 0, 1 and 2, with the following exceptions.

Port 3 (FIG. 13B) can be configured to be operated at speeds up to 56,000 bits per second. Moreover, when operating between 20,000 bits per second and 56,000 bits per second, data transfer is controlled by the DMA controller 20 (FIGS. 1 and 5). When operating below 20,000 bits per second, data transfer is controlled by interrupt logic 36 (FIGS. 1 and 12), as is the case with ports 0, 1 and 2 of FIG. 13A, or by DMA controller 20 (FIGS. 1 and 5).

The drivers 176 and receivers 178 of port 3 of FIG. 13B can be configured either as EIA RS423-compatible or EIA RS422-compatible devices. When operating above 20,000 bits per second, the drivers 176 and receivers 178 must be configured as an EIA RS-422 interface.

Operation of the synchronous communications multiplexer 10 is as follows. When the SCM 10 is powered on, and whenever the SCM 10 receives a hardware reset signal, the MPU 24 initializes the elements of the SCM 10. The microcode that executes this sequence is located in the PROM 26. At the end of this sequence, the SCM 10 is prepared to accept a Load Writable Control Store (LWCS) command for the data transfer operation. The SCM 10 is also prepared to accept a remote IPL sequence from those designated ports (ports 0-2 of FIG. 13A) which are configured for such an operation (see FIG. 6).

A remote IPL is initiated across a communication line when a unique message is received by the SCM 10. The IPL sequence causes the "host" processor to be "bootstrap" loaded.

The Load Writable Control Store (LWCS) command causes the SCM 10 to be down loaded with operating microcode. When the SCM 10 receives the WCS command, it accepts data from the MP bus. The data received is in the following format:

[BC] [ADDRESS] [ ... DATA ... ] [CS]

The SCM 10 loads software data information to the RAM 28, the address in the RAM 28 being specified in each data frame. The final data frame in the load sequence contains a zero byte count and the execution starting address. When the MPU 24 detects this zero byte count, execution is passed to the starting address. Following the LWCS command execution, the SCM 10 is prepared to accept Mode Control commands. Mode Command specifies the communication line, the characteristics of the line protocol and communication line configuration to be handled. The Mode Command initializes the line to begin data transfer across the link.

A Line Control command is available to allow the "host" software to set and reset communication control lines and to set the "ping-pong" mode of operation. The "ping-pong" mode is a special transmitter mode for high efficiency transmission. This is further discussed in the next several paragraphs.

The primary purpose of the SCM 10 is to transmit and receive data across a communication link. The SCM 10 transmits data when it receives a Write command. Upon receipt of the Write command, the MPU 24 instructs the GPIB 14 to transfer data to the RAM 28. When the data has been received, the MPU 24 initiates outbound data transmission to the port (ports 38-41). The data transmission proceeds either as an interrupt-driven operation (see FIG. 12) or as a DMA-type operation (see FIG. 5). At completion of the operation, the MPU 24 instructs the GPIB 14 to return a Status byte to the IOP. The Status byte reflects the ending condition of the operation. Any error or exception conditions are reported at this time.

To achieve high transmission line efficiency, the SCM 10 provides for an operation referred to as "transmitter queueing". This operation allows two write operations to be active simultaneously. The "ping-pong" mode of operation which is established with the line control command evokes "transmitter queueing". "Transmitter queueing" requires that the write commands be issued to alternate subchannels in the SCM 10. Operating in this mode allows the SCM 10 to pre-fetch outgoing messages, and to initiate a transmit to the communication line immediately upon completion of the previous transmit operation.

A comparison of Queued and Non-Queued operations is facilitated by reference to Table 15 below.

TABLE 15

| Normal (Non-Queued) Operation: | | | | |
|---|---|---|---|---|
| Host event: | Command | Status-Command | | Status |
| Controller: | [fetch data] | [fetch data] | | |
| Comm line: | [transmit] | [transmit] | | |
| Queued Operation: | | | | |
| Host event 0: | Command | Status-command | | |
| Host event 1: | Command | Status-command | | |
| Controller 0: | [fetch] | [fetch] | | |
| Controller 1: | [fetch] | [fetch] | | |
| Comm line: | [Trans 0] | [Trans 1] | [Trans 0] | [Trans 1] |

In normal operation, the sequence of events is as follows: (1) the host software issues a Write command; (2) the SCM 10 fetches data from the IOP; (3) the SCM 10 transmits to the communication line; (4) at the completion of operation, status is returned to the host software; (5) the host issues a new Write command.

In Queued operation, the sequence is as follows: (1) the host issues a Write command to the TX0; (2) the SCM 10 fetches the TX0 data from the IOP, and the host issues a Write command TX1; (3) the SCM 10 transmits TX0 data to the communication line, and the SCM 10 fetches TX1 data from the IOP; (4) at the completion of the TX0 transmit, the TX1 transmit is initiated, and status is returned for TX0; (5) a new Write command is issued to the TX0; (6) the SCM 10 fetches data for the TX0; and (7) at the completion of the TX1 transmit, the TX0 transmit is initiated, and status is returned for the TX1. Step 3 is accomplished by utilizing the buffers in the RAM and having the DMA input data into one buffer while the microprocessor is freed to transfer data out of the other buffer.

Transmitter-queued operation allows the communication line that was idle during normal operation to be used to transmit data. This results in high line utilization and high communication line efficiency.

Receiver operation is as follows. Inbound data is input from the port (one of ports 38–41 of FIGS. 1 and 13A) to the RAM 28 (FIGS. 1 and 10) as messages are received on a line. Data is transferred to the GPIB 14 (FIGS. 1 and 2) in response to Read commands.

If a Read command is pending when a message is received, it is immediately transferred to the GPIB 14 (FIGS. 1 and 2). If no Read command is pending, it is stored in the RAM 28 (FIGS. 1 and 10) until a Read command is received. This feature provides a level of buffering between a communication line and a host processor.

While preferred forms and arrangements have been shown in illustrating the invention, it is to be clearly understood that various changes in detail and arrangement may be made without departing from the spirit and scope of this disclosure.

What is claimed is:

1. A synchronous communications multiplexer adopted to couple a synchronous communications line to a host computer via multi-purpose bus and an input output processor, said host computer generating a plurality of microcode instruction sets, each microcode instruction set corresponding to a different communications protocol and mode of data transfer over said communications line, said host computer generating control commands relating to the data transfer across said communications line including a load control command and a write command in one instance for sending one data block outbound across said communications line in accordance with one mode of data transfer and a read command in another instance for receiving another data block inbound across said communications line; the synchronous communications multiplexer comprising:
   a microprocessor means coupled to an internal bus;
   an I/O interface means for interfacing said microprocessor means to said multi-purpose bus via said internal bus;
   memory means for storing the outbound data block and the corresponding microcode instruction set, and said memory means being coupled to said internal bus;
   direct memory access controller means for transferring said outbound data block between said multi-purpose bus and said memory means via said internal bus and said interface means upon receipt of a first transfer command;
   a port being coupled to said communications line;
   a port interface means for transferring data to and receiving data from said port, said port interface means including a programmable modem control and line interface circuit means for generating and detecting various line communication control signals which control the outbound and inbound transfer of data blocks across said port and said communications line, and said port interface means being coupled to said internal bus;
   said microprocessor means including:
   means for obtaining the corresponding microcode instruction set related to said one mode of data transfer and storing the same in said memory means upon receipt of said load control command;
   means for executing said corresponding microcode instruction set upon storage thereof in said memory means and programming said programmable modem control and line interface circuit means in accordance therewith;
   means for generating said first transfer command upon receipt of said write command in said one instance and applying said first transfer command to said direct memory access controller means;
   means for controlling said port interface means to direct said outbound data block over said communications line from said memory means; and
   means for coordinating the inbound transfer of said another data block received at said port to said multi-purpose bus upon receipt of said read command.

2. A synchronous communications multiplexer as claimed in claim 1 wherein a plurality of communications lines are coupled to said host computer via said multi-purpose bus and said input output processor, said control commands including mode control commands specifying line protocol, configuration and selection, which are generated prior to the programming of said programmable modem control and line interface circuit means, and the synchronous communications multiplexer includes:

a plurality of ports corresponding to said plurality of communications lines, respective ones thereof being coupled to a corresponding one of said plurality of communications lines;

a plurality of port interface means and programmable modem control and line interface circuit means, respective ones thereof being associated with a corresponding one of said plurality of ports;

said means for executing programming said plurality of programmable modem control and line interface circuit means in accordance with the obtained and stored microcode instruction sets; and said means for controlling said plurality of port interface means including means for managing the substantially simultaneous transfer of data over said plurality of communications lines.

3. A synchronous communications multiplexer as claimed in claim 2 wherein said control commands include a transmitter queueing command, said multipurpose bus carrying a first and a second outbound data block directed to a single communications line, said memory means including a first and a second data buffer therein, and said microprocessor means including means for funneling said first and second outbound data blocks onto said single communications line upon receipt of said transmitter queueing command by utilizing a means for transmitting said first outbound data from said first data buffer, said direct memory access means including means for strobing said second outbound data block into said second data buffer substantially simultaneously with said means for transmitting and storing said second outbound data block within said second data buffer, thereby increasing the utilization of said single communications line.

4. A synchronous communications multiplexer as claimed in claim 2 wherein said means for obtaining includes an unalterable read only memory means having stored therein executive control programs executable by said microprocessor means relating to the down loading of the various microcode instruction sets into said memory means upon receipt of said load control command.

5. A synchronous communications multiplexer as claimed in claim 2 wherein said microprocessor includes means for storing inbound data into said memory means and said memory means includes a plurality of memory elements therein, one of said plurality of memory elements storing data blocks therein, another one of said plurality of memory elements storing said corresponding microcode instruction set therein, and the balance of said plurality of memory elements storing other data blocks and other microcode instruction sets corresponding to different data transfers over said plurality of communications lines.

6. A synchronous communications multiplexer as claimed in claim 2 wherein said direct memory access controller means includes means for transferring said outbound data block between said memory means and one of said plurality of ports upon generation of a second transfer command signal supplied by said microprocessor means in accordance with a certain control command issued by said host computer.

7. A synchronous communications multiplexer as claimed in claim 2 wherein one of said plurality of communications lines carries a remote program load command, and said microprocessor means includes means for recognizing said remote program load command and means for actuating said means for obtaining the microcode instruction set corresponding to said remote program load command upon receipt thereof.

* * * * *